United States Patent [19]

Cannetti

[11] Patent Number: 5,633,926
[45] Date of Patent: May 27, 1997

[54] NETWORK INTERFACE ENCLOSURE

[75] Inventor: Robert J. Cannetti, Deer Park, N.Y.

[73] Assignee: TII Industries, Inc., Copiague, N.Y.

[21] Appl. No.: 425,186

[22] Filed: Apr. 19, 1995

[51] Int. Cl.$^6$ .................................................. H04M 1/00
[52] U.S. Cl. ........................ 379/440; 379/437; 379/451; 379/453; 379/399
[58] Field of Search ............................ 379/428, 399, 379/453, 412, 441, 442, 437, 451; 16/321, 303, 334, 348

[56] References Cited

U.S. PATENT DOCUMENTS

| | | |
|---|---|---|
| D. 297,136 | 8/1988 | Collins et al. . |
| D. 304,339 | 10/1989 | Collins et al. . |
| D. 314,759 | 2/1991 | Collins et al. . |
| 993,154 | 5/1911 | Dailey ........................ 16/348 |
| 4,882,647 | 11/1989 | Collins . |
| 4,910,770 | 3/1990 | Collins et al. . |
| 4,945,559 | 7/1990 | Collins et al. . |
| 4,949,376 | 8/1990 | Nieves et al. . |
| 4,979,209 | 12/1990 | Collins et al. . |
| 5,027,474 | 7/1991 | Bowers ........................ 16/303 |
| 5,145,388 | 9/1992 | Browlie et al. ............... 379/399 |

OTHER PUBLICATIONS

"SNI–5000 Tomorrow's Network Interface System . . . Today", Dec. 1985, Keptel, Inc.

*Primary Examiner*—Jack K. Chiang
*Attorney, Agent, or Firm*—Morgan & Finnegan

[57] ABSTRACT

A network interface enclosure for mounting on a vertical surface and for enclosing network interface devices. The network interface enclosure has subscriber and telco covers that permit access to subscriber and telco compartments. The subscriber cover and telco cover are attached to the base of the network interface enclosure by detent mechanisms so that the covers generally hinge about the detent mechanisms and can be retained in a variety of open positions. The detent mechanisms are attached to the upper portion of the subscriber and telco covers so that the subscriber and telco covers are lifted upwardly to open. Particular constructions of detent mechanisms are disclosed.

7 Claims, 30 Drawing Sheets

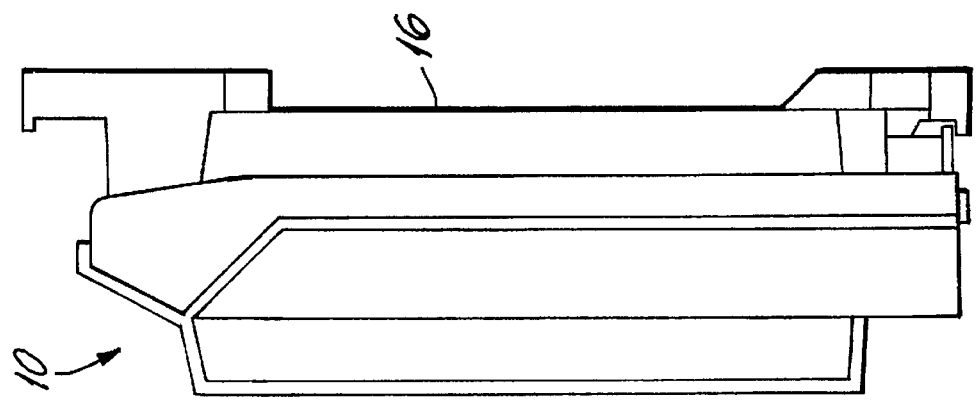
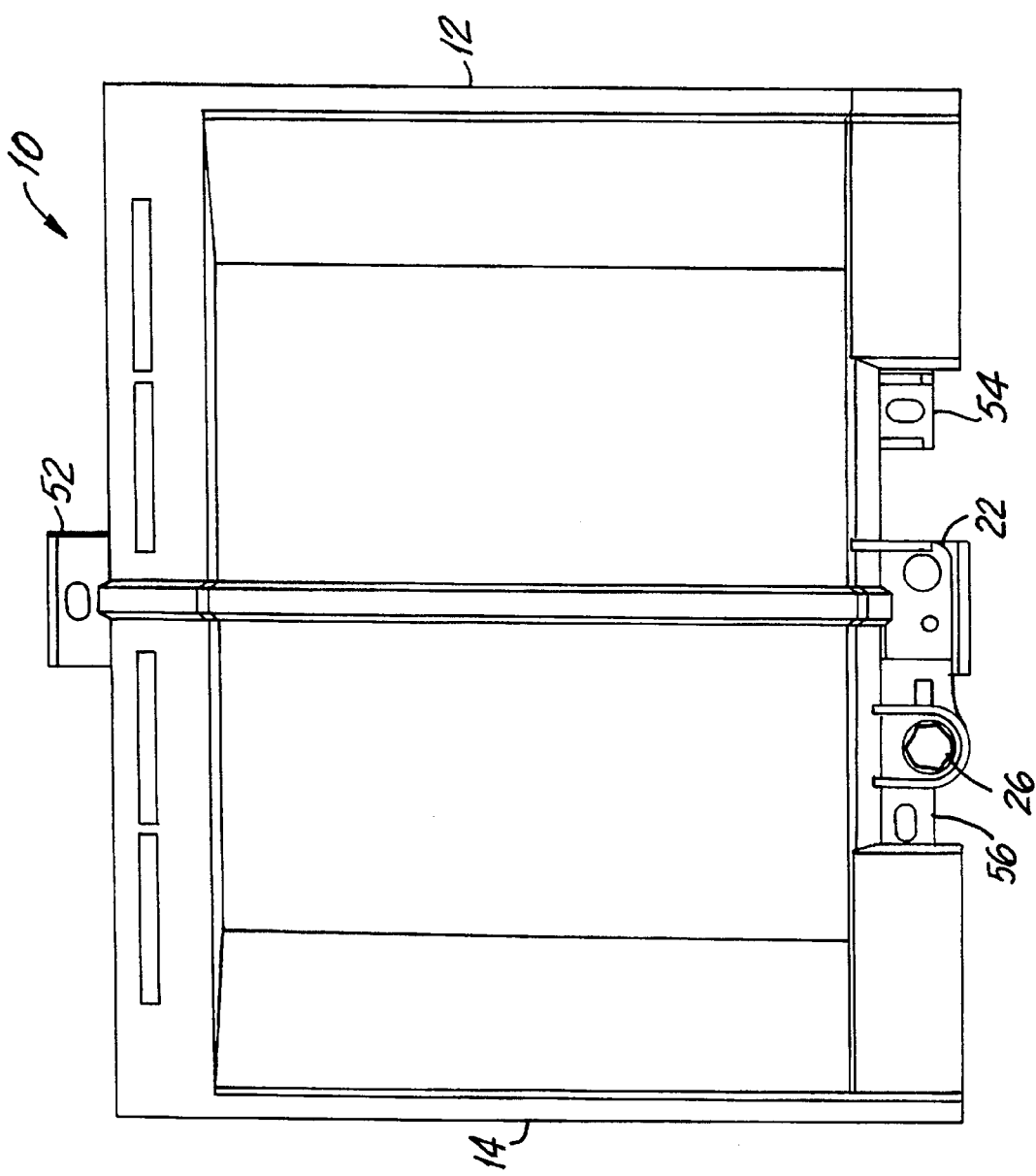

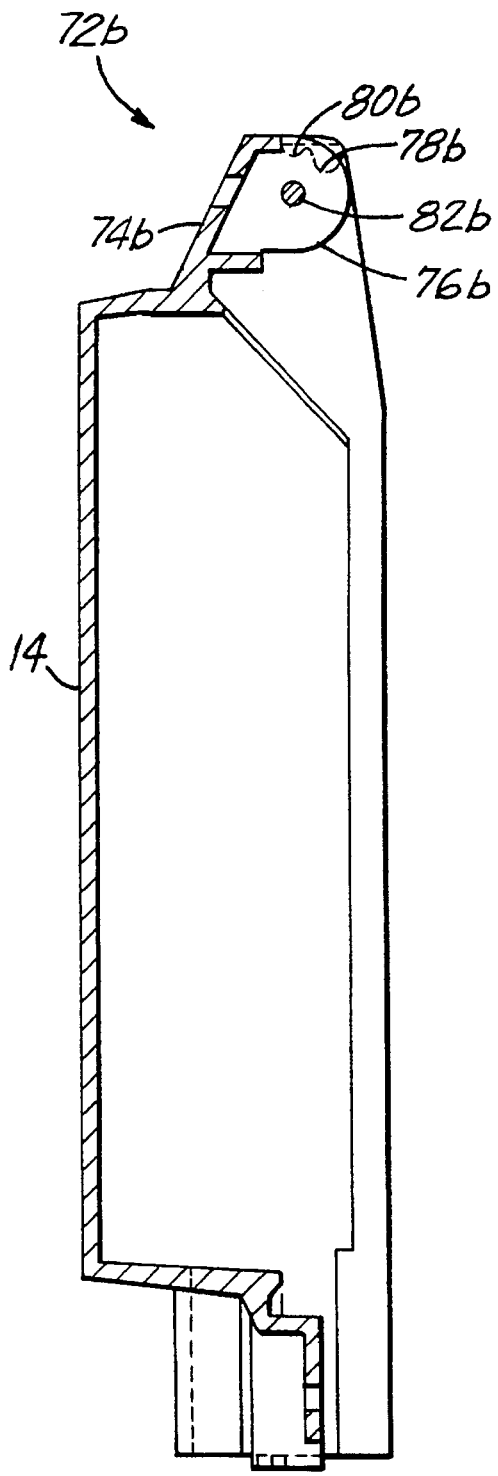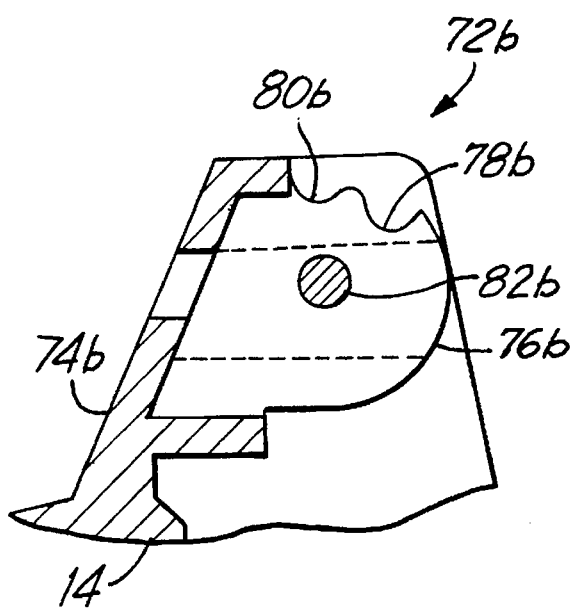
FIG. 21
FIG. 22

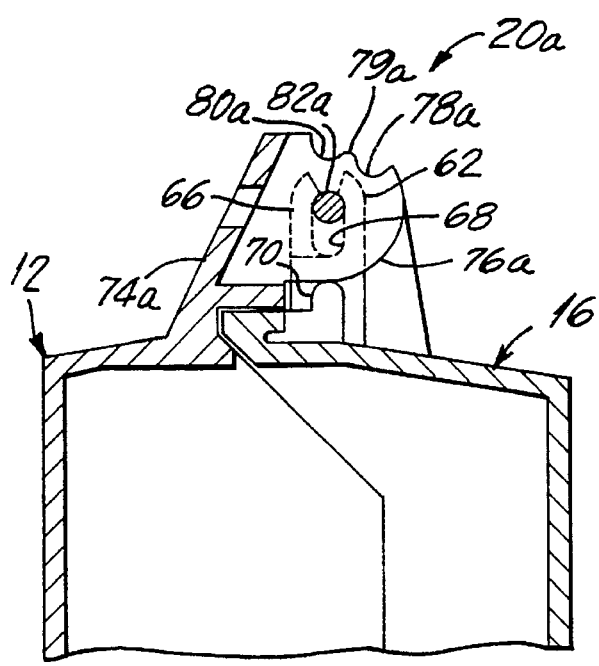
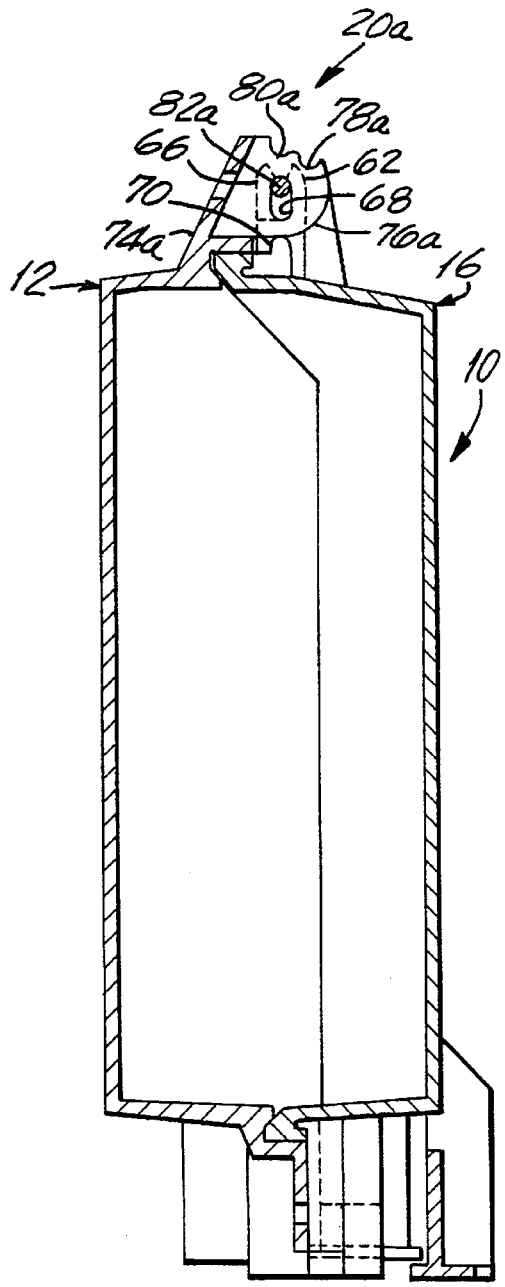
FIG. 24
FIG. 25

NETWORK INTERFACE ENCLOSURE

BACKGROUND OF THE INVENTION

1. Field of the Invention

The present invention relates to a telephone network interface enclosure for protecting telephone network interface devices. In particular, the invention relates to a network interface enclosure having two covers, a subscriber cover and a telephone company ("telco") cover. The subscriber cover can be opened to expose a subscriber compartment and subscriber portions of telephone network interface devices in that compartment. The telco cover can be opened to expose a telco compartment and telco portions of telephone network interface devices in that compartment.

The subscriber and telco covers are attached to a base portion of the network interface enclosure by detent mechanisms so that the covers generally hinge about the detent mechanisms and can be retained in open positions. The detent mechanisms are formed from cooperating elements attached to both the subscriber and telco covers and the base portion of the network interface enclosure.

In one embodiment of the invention, the subscriber and telco covers each include portions having a notched caming surface and a pin. The base portion of the network interface enclosure includes stops and slots formed between fingers that protrude from the base portion. The pins on the subscriber and telco covers are received in the slots formed between the protruding fingers and caming surfaces on the subscriber and telco covers abut the stops on the base portion.

In operation, when the subscriber and telco covers are in a closed position, the caming surfaces on the covers rest on stops on the base portion of the network interface enclosure and the pins on the covers are retained in the top of slots of the base portion. As the covers are opened, the caming surfaces ride along the stops until the stops reach the notches. When a stop reaches a notch, the stop is retained in the notch, the cover shifts downwardly so that the pin on the cover rests in the bottom of the slot on the base portion of the network interface enclosure and the cover is retained in an open position.

In another embodiment of the invention, the subscriber and telco covers each include portions having caming surfaces, flat surfaces and pins. The base portion of the network interface enclosure includes hinge portions and cantilever springs. The pins on the subscriber and telco covers are received in the hinge portions on the base portion and the caming surfaces on the subscriber and telco covers abut the cantilever springs on the base portion.

In operation, when the subscriber and telco covers are in a closed position, the caming surfaces on the covers rest on the cantilever springs on the base portion of the network interface enclosure and the pins on the covers are retained in the hinge portions on the base portion. As the covers are opened, the caming surfaces ride along the top surfaces of the cantilever springs until the flat surfaces reach the top surface of the cantilever springs. When the flat surfaces reach the cantilever springs, the force of the cantilever springs interacting with the flat surfaces retains the covers in open positions.

2. Discussion of Related Art

Telephone subscribers may purchase and install their own telephone equipment and related appliances. Those subscribers are responsible for the proper operation of their equipment and the telephone company is responsible for the service only up to the juncture between the telco wiring and the subscribers wiring. Thus, it is desirable to provide a telephone network interface enclosure providing protection for and ready access to telephone network interface devices. The telephone network interface devices in turn allow connection and disconnection of subscribers wiring from telco wiring so that the subscribers can readily isolate problems to the telco or subscriber equipment.

Network interface enclosures are now available for use in covering telephone network interface devices. Typical in the art are the network interface enclosures shown in U.S. Pat. Nos. Des. 314,759 issued to Thomas J. Collins et al. on Feb. 19, 1991, 4,979,209 issued to Thomas J. Collins et al. on Dec. 18, 1990, 4,949,376 issued to Anthony L. Nieves et al. on Aug. 14, 1990, 4,945,559 issued to Thomas J. Collins et al on Jul. 31, 1990, 4,910,770 issued to Thomas J. Collins et al on Mar. 20, 1990, 4,882,647 issued to Thomas J. Collins et al. on Nov. 21, 1989, Des. 304,339 issued to Thomas J. Collins et al. on Oct. 31, 1989, and Des. 297,136 issued to Thomas J. Collins et al. on Aug. 9, 1988. There remains, however, a need in the art for a network interface enclosure that provides easy access to modular devices contained in the enclosure having low cost and maintenance and increased functionality and reliability.

The Collins et al. U.S. Pat. Nos. 4,979,209, 4,945,559, 4,882,647, Des. 304,339 and Des. 297,136 and the Nieves et al. U.S. Pat. No. 4,949,376 disclose network interface enclosures having subscribers and telco covers hinged on their sides to the network interface enclosure base. Network interface enclosures having subscriber and telco covers hinged at their sides have the disadvantage that the covers impede access to the network interface devices enclosed within the network interface enclosure.

The Collins et al. U.S. Pat. Nos. Des. 314,759 and 4,910,770 and the Nieves et al. U.S. Pat. No. 4,949,376 disclose network interface enclosures having covers hinged at their tops to a base portion of the network interface enclosure. However, the network interface enclosures disclosed in those patents have the disadvantage there is no means provided for holding the subscriber and telco covers in an open position, Thus, in use, the subscriber and telco cover naturally close and require repeated reopening.

SUMMARY OF THE INVENTION

The present invention overcomes many of the disadvantages of the prior art network interface enclosures as exemplified by the various patents already discussed.

The present invention provides for a network interface enclosure for mounting on a vertical surface and for enclosing network interface devices. The network interface enclosure has subscriber and telco covers that permit access to subscriber and telco compartments such that when the subscriber cover is in an open position a subscriber has access to a subscriber portion of the network interface device and when the telco cover is in an open position a telephone company technician has access to both the telco portion and subscriber portion of the network interface device.

The subscriber cover and telco cover are attached to the base of the network interface enclosure by detent mechanisms so that the covers generally hinge about the detent mechanisms and can be retained in open positions. The detent mechanisms are attached to the upper portions of the subscriber and telco covers. To be opened, the subscriber cover and telco cover are lifted upwardly.

In one embodiment of the invention, the detent mechanisms are formed from cooperating elements attached to both the subscriber and telco covers and the base portion of the network interface enclosure. The subscriber and telco covers each include portions having a notched caming surface and a pin. The base portion of the network interface enclosure includes stops and slots formed between fingers that protrude from the base portion. The pins on the subscriber and telco covers are received in the slots formed between the protruding fingers and the caming surfaces on the subscriber and telco covers abut the stops on the base portion.

In operation, when the subscriber and telco covers are in a closed position, the caming surfaces on the covers rest on stops on the base portion of the network interface enclosure and the pins on the covers are retained in the top of slots of the base portion. As the covers are opened, the caming surfaces ride along the stops until the stops reach the notches. When a stop reaches a notch, the stop is retained in the notch, the cover shifts downwardly so that the pin on the cover rests in the bottom of the slot on the base portion of the network interface enclosure and the cover is retained in an open position.

In another embodiment of the invention, the subscriber and telco covers each include portions having caming surfaces, flat surfaces and pins. The base portion of the network interface enclosure includes hinge portions and cantilever springs. The pins on the subscriber and telco covers are received in the hinge portions on the base portion and the caming surfaces on the subscriber and telco covers abut the cantilever springs on the base portion.

In operation, when the subscriber and telco covers are in a closed position, the caming surfaces on the covers rest on the cantilever springs on the base portion of the network interface enclosure and the pins on the covers are retained in the hinge portions on the base portion. As the covers are opened, the caming surfaces ride along the top surfaces of the cantilever springs until the flat surfaces reach the top surfaces of the cantilever springs. When the flat surfaces reach the cantilever springs, the force of the cantilever springs interacting with the flat surfaces retains the covers in open positions.

The present invention also provides for retention of the subscriber and telco covers in an open position at a variety of angles. Caming surfaces on the covers may be provided with multiple notches or flat surfaces so that the covers may be retained in multiple opened positions at a variety of angles.

Thus, the present invention provides for ready access to network interface devices enclosed within a network interface enclosure. Not only are the subscriber and telco covers hinged at their top so that the covers do not impede access to the network interface devices, but the covers are attached by detent mechanisms so that the covers are retained in an open position while a telco service technician is accessing network interface devices contained within the network interface enclosure.

The foregoing advantages of the present invention will become apparent from the following description of the preferred embodiment which is intended to illustrate but not limit the invention.

DESCRIPTION OF THE DRAWINGS

FIG. 1 is a front view of a network interface enclosure with a subscriber cover and a telco cover in a closed position.

FIG. 2 is a side view of the network interface enclosure of FIG. 1.

FIG. 21 is a sectional view of the telco cover of the network interface enclosure at sectional lines 21—21 in FIG. 18.

FIG. 22 is a sectional view of elements of the detent mechanism attached to the telco cover of the network interface enclosure at sectional lines 22—22 in FIG. 18.

FIG. 24 is a sectional view of the detent mechanism of the network interface enclosure.

FIG. 25 is a sectional view of the network interface enclosure showing operation of the detent mechanism when the subscriber cover is in a closed position.

DESCRIPTION OF PREFERRED EMBODIMENTS

Figure 3:
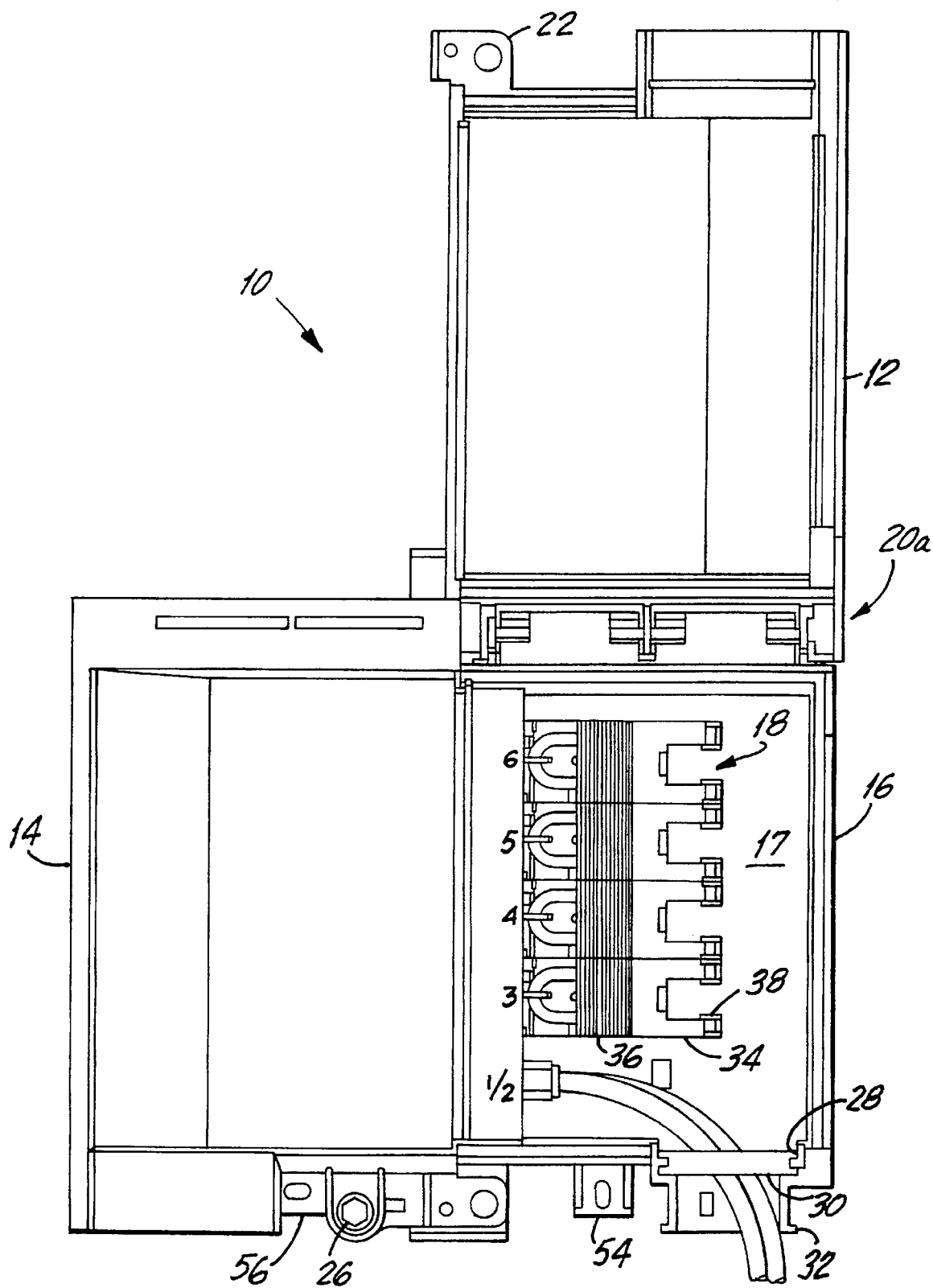
FIG. 3 is a front view of the network interface enclosure of FIG. 1 with the subscriber cover in an open position such that the subscriber compartment is visible.

Referring to the figures, and in particular FIGS. 1–4, there is shown a telephone network interface enclosure 10 according to the principles of the present invention. The telephone network interface enclosure 10 includes a subscriber cover 12, a telco cover 14, a base 16 and a compartment 17 for receiving network interface devices 18. The telephone network interface enclosure 10 is mounted on a vertical surface. The subscriber cover 12 and telco cover 14 are hinged by detent mechanisms 20a and 20b to the base 16 of the telephone network interface enclosure 10.

The subscriber cover 12 may be secured in a closed position by a conventional fastener (not shown) at latch 22. Upon removing the fastener, the subscriber cover 12 can be lifted upward and generally hinged about the detent mechanisms 20a to an open position as shown in FIG. 3. When the subscriber cover 12 is open, a subscriber portion of the compartment 17 for receiving network interface devices 18 and the subscriber portion of the network interface devices 18 are visible.

Figure 4:
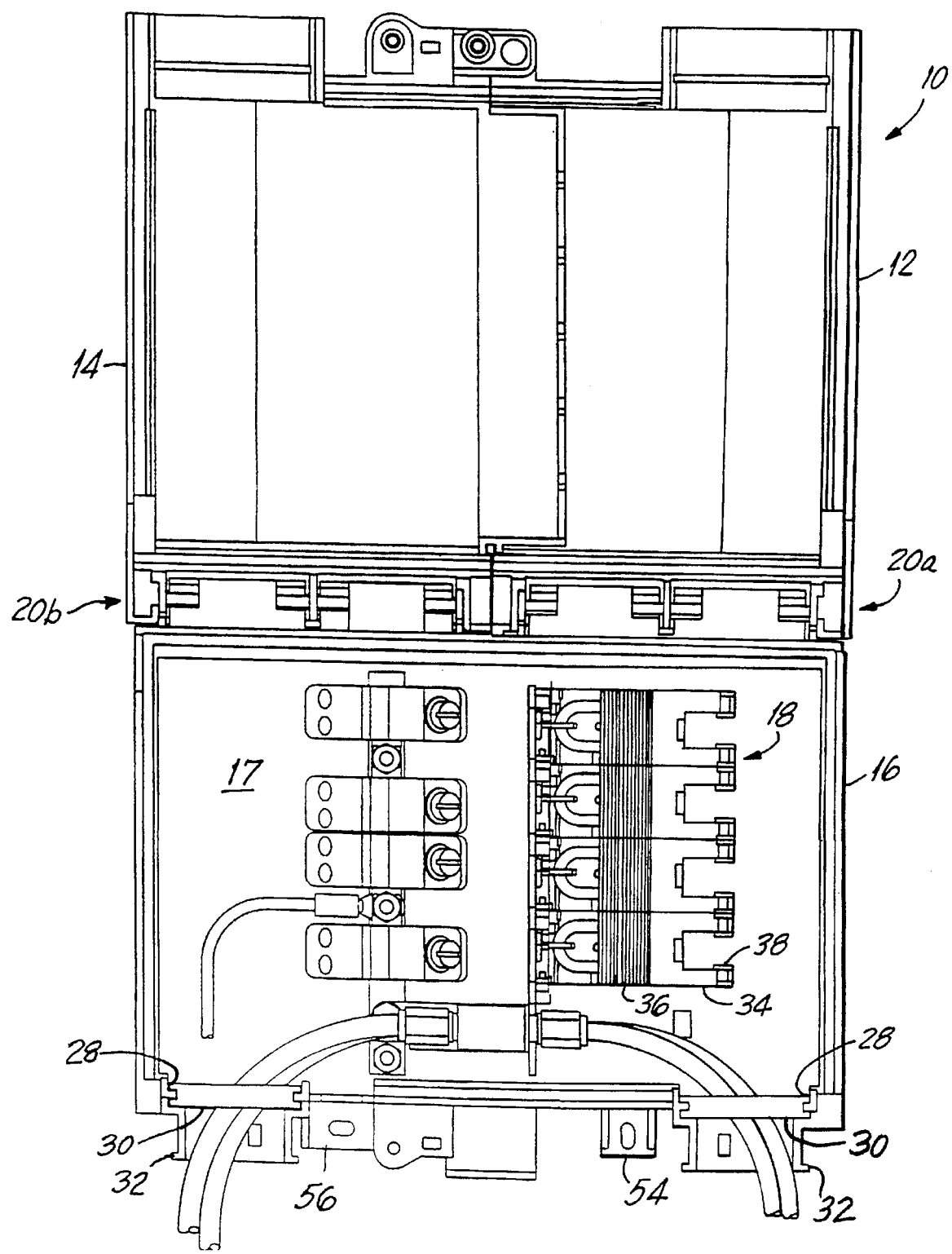
FIG. 4 is a front view of the network interface enclosure of FIG. 1 with the subscriber and telco covers in open positions such that the subscriber and telco compartments are visible.
Figure 5:
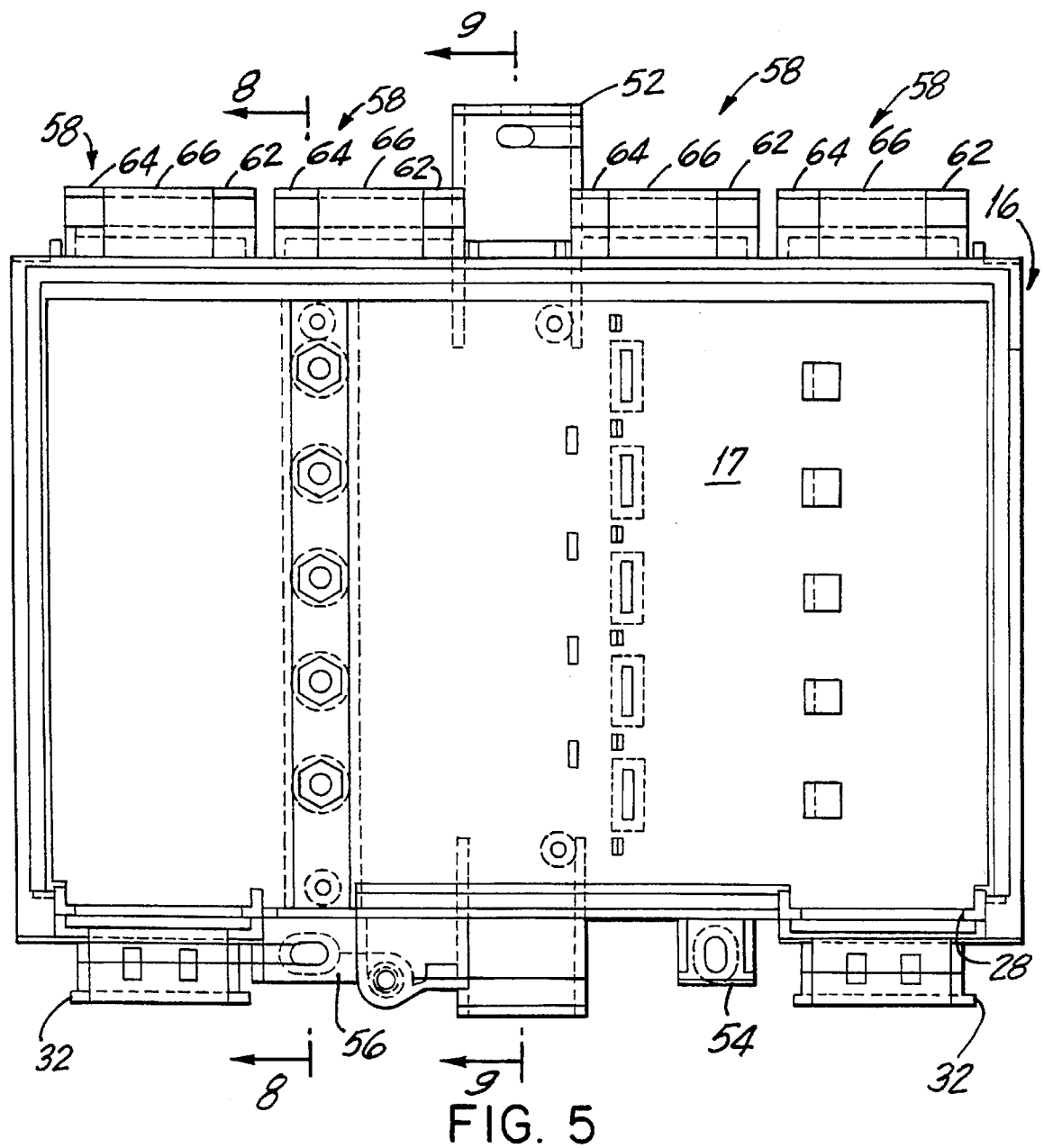
FIG. 5 is a front view of a base portion of the network interface enclosure.
Figure 6:
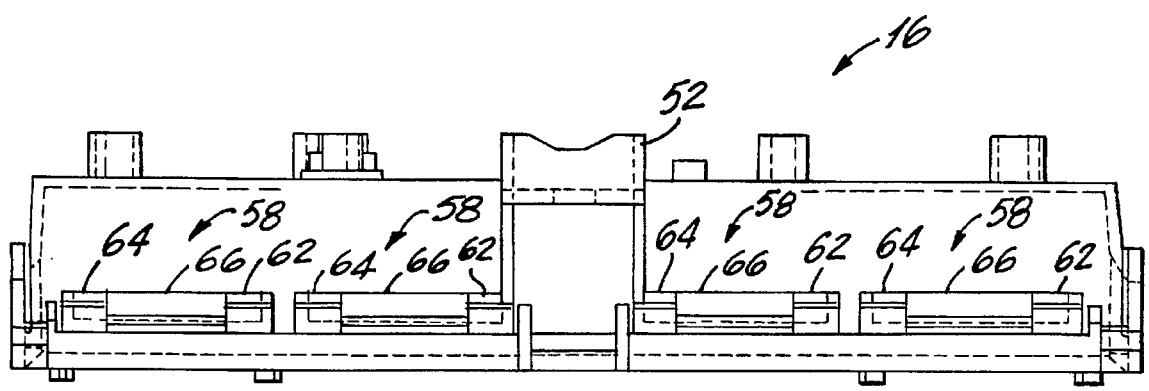
FIG. 6 is a top view of the base portion of the network interface enclosure.
Figure 7:
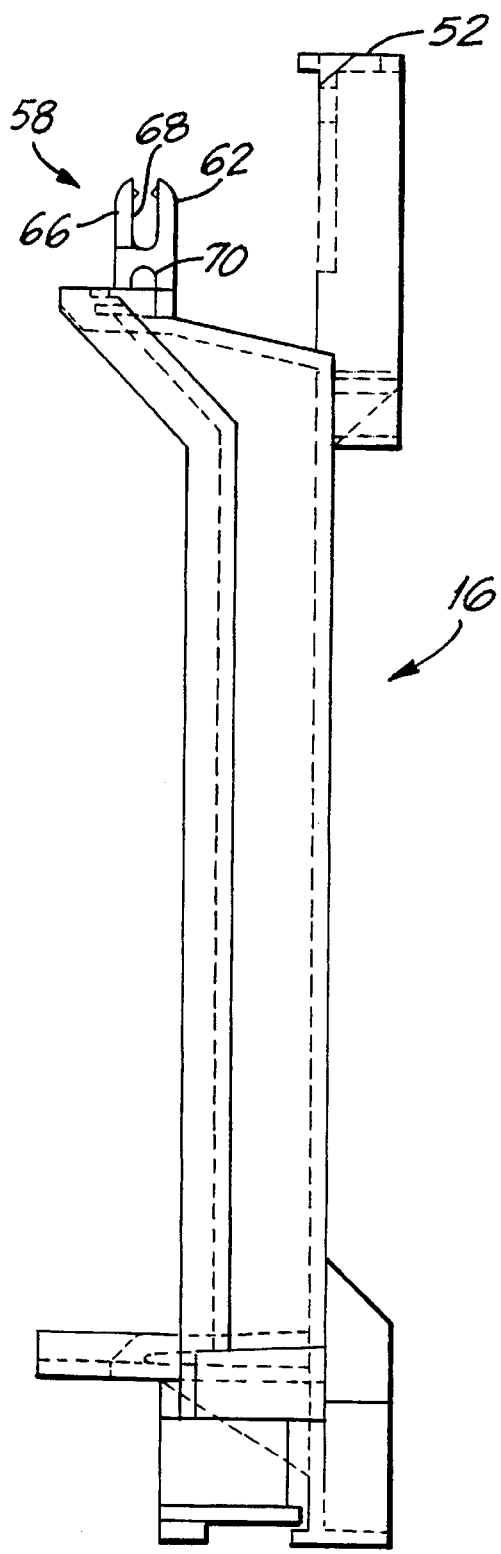
FIG. 7 is a side view of the base portion of the network interface enclosure.
Figure 8:
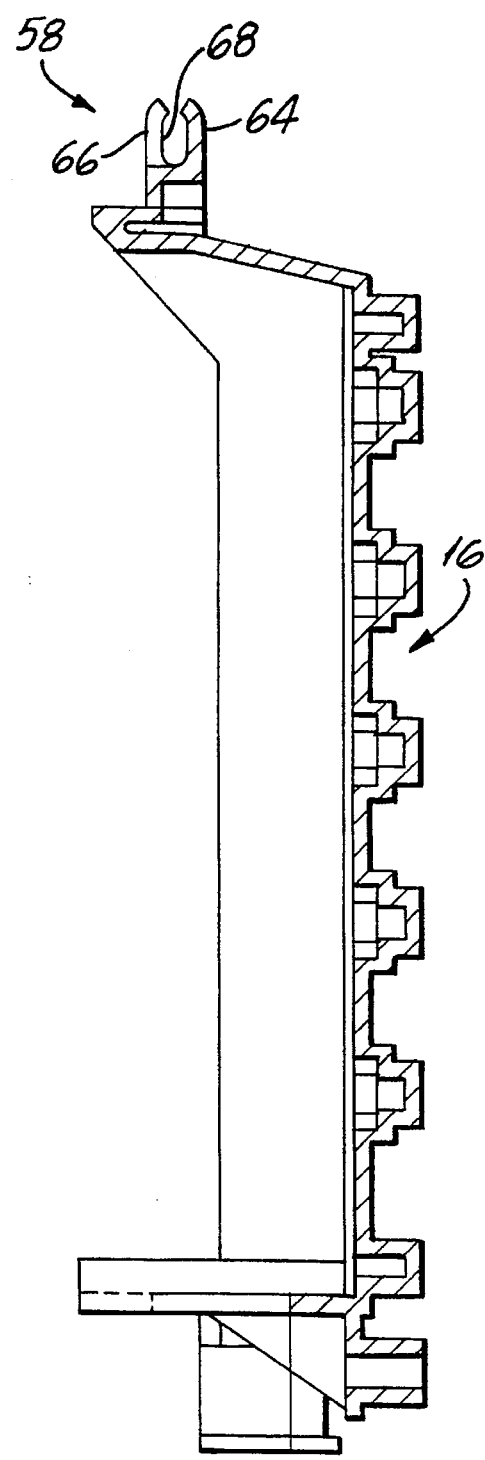
FIG. 8 is a sectional view of the base portion of the network interface enclosure at sectional lines 8—8 in FIG. 5.
Figure 9:
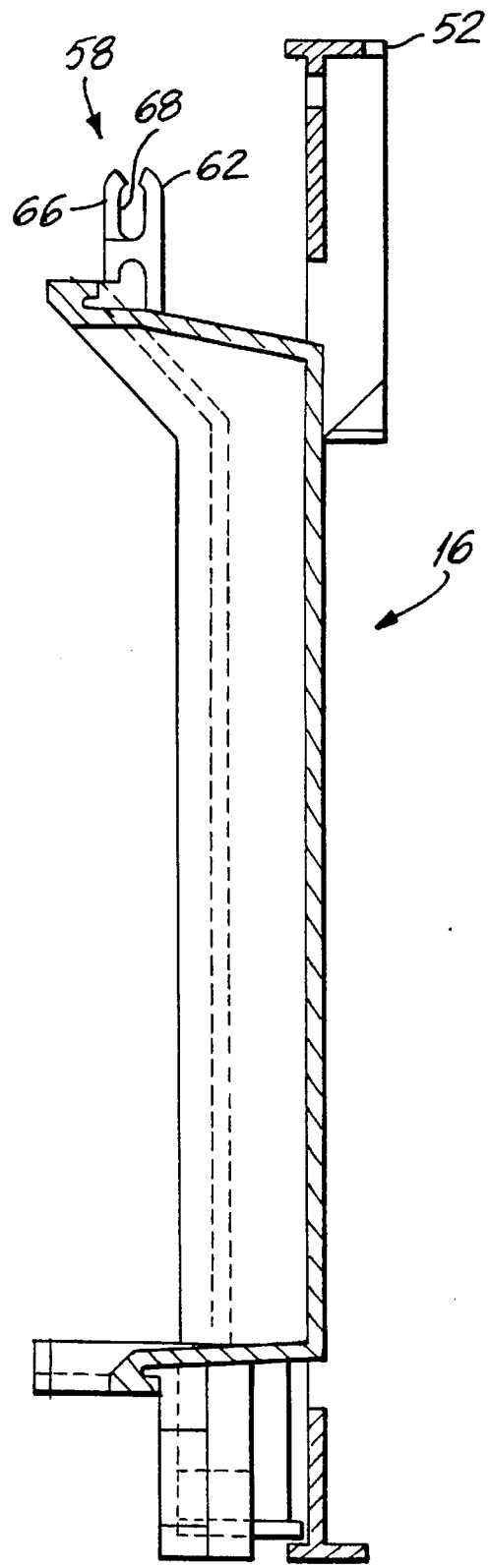
FIG. 9 is a sectional view of the base portion of the network interface enclosure at sectional lines 9—9 in FIG. 5.
Figure 10:
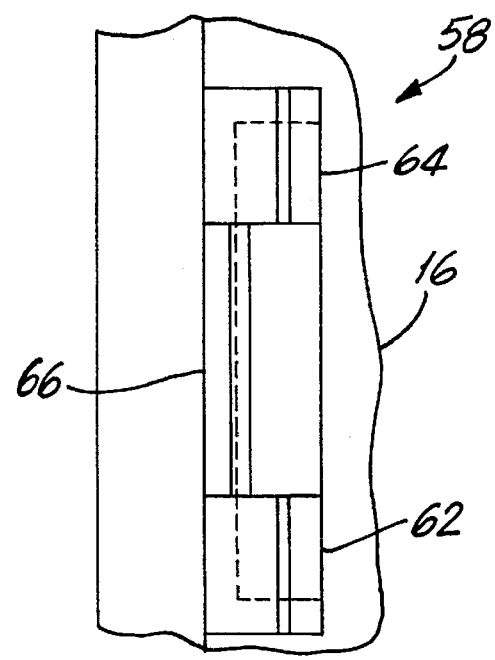
FIG. 10 is a top view of elements of a detent mechanism attached to the base portion of the network interface enclosure.
Figure 11:
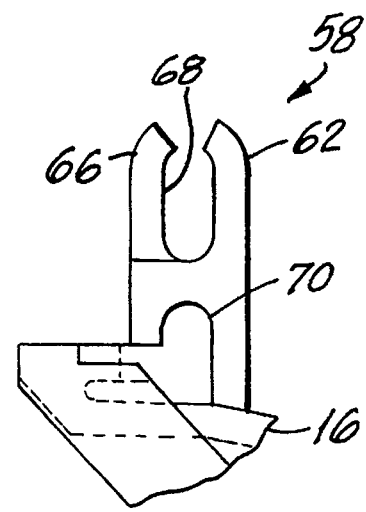
FIG. 11 is a side view of the elements of the detent mechanism attached to the base portion of the network interface enclosure.
Figure 12:
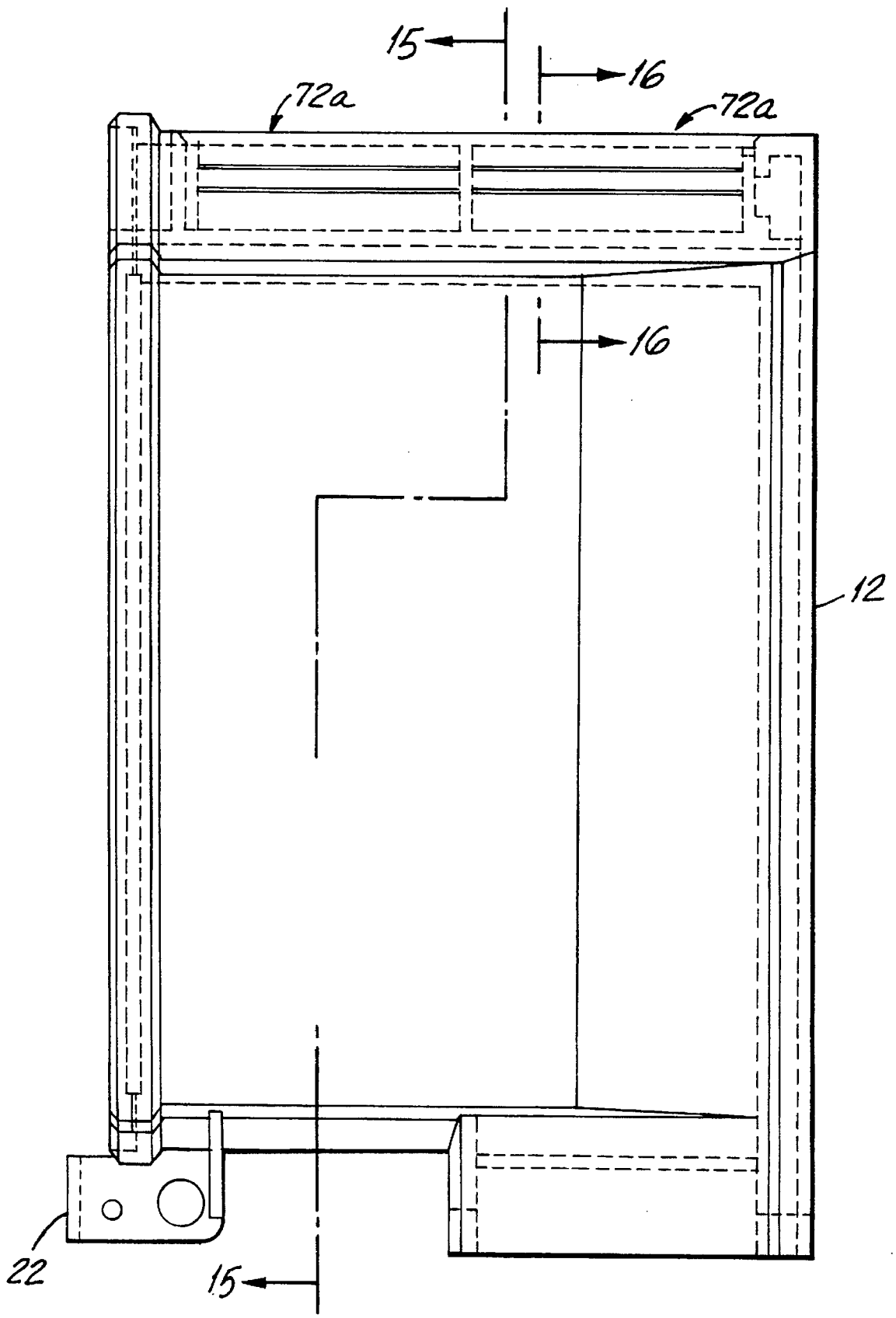
FIG. 12 is a front view of the subscriber cover of the network interface enclosure.
Figure 13:
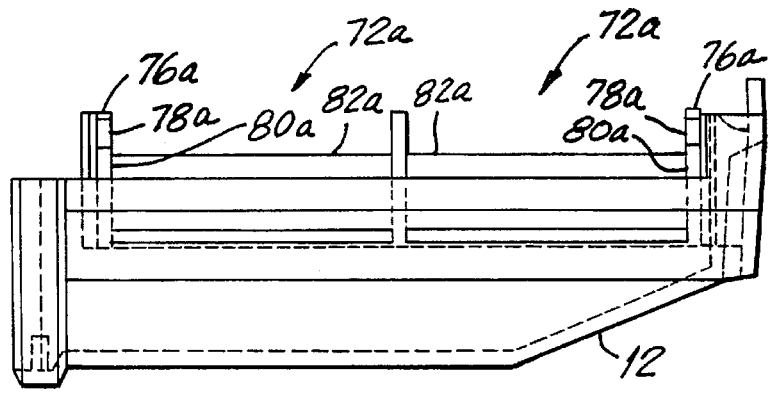
FIG. 13 is a top view of the subscriber cover of the network interface enclosure.
Figure 14:
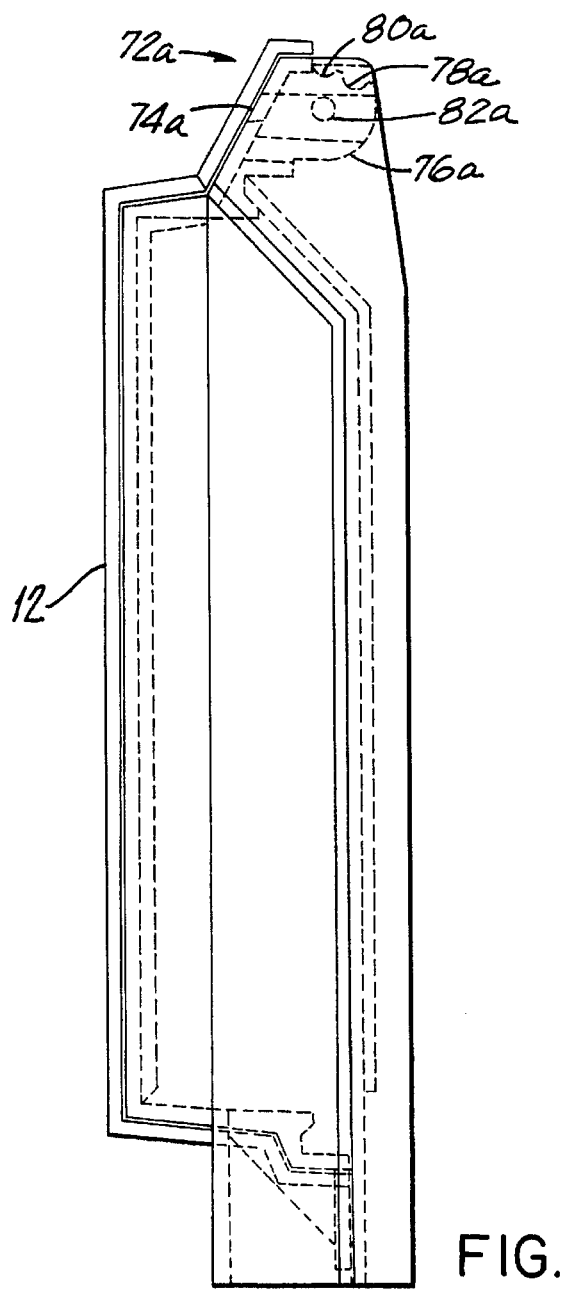
FIG. 14 is a side view of the subscriber cover of the network interface enclosure.
Figures 15, 16:
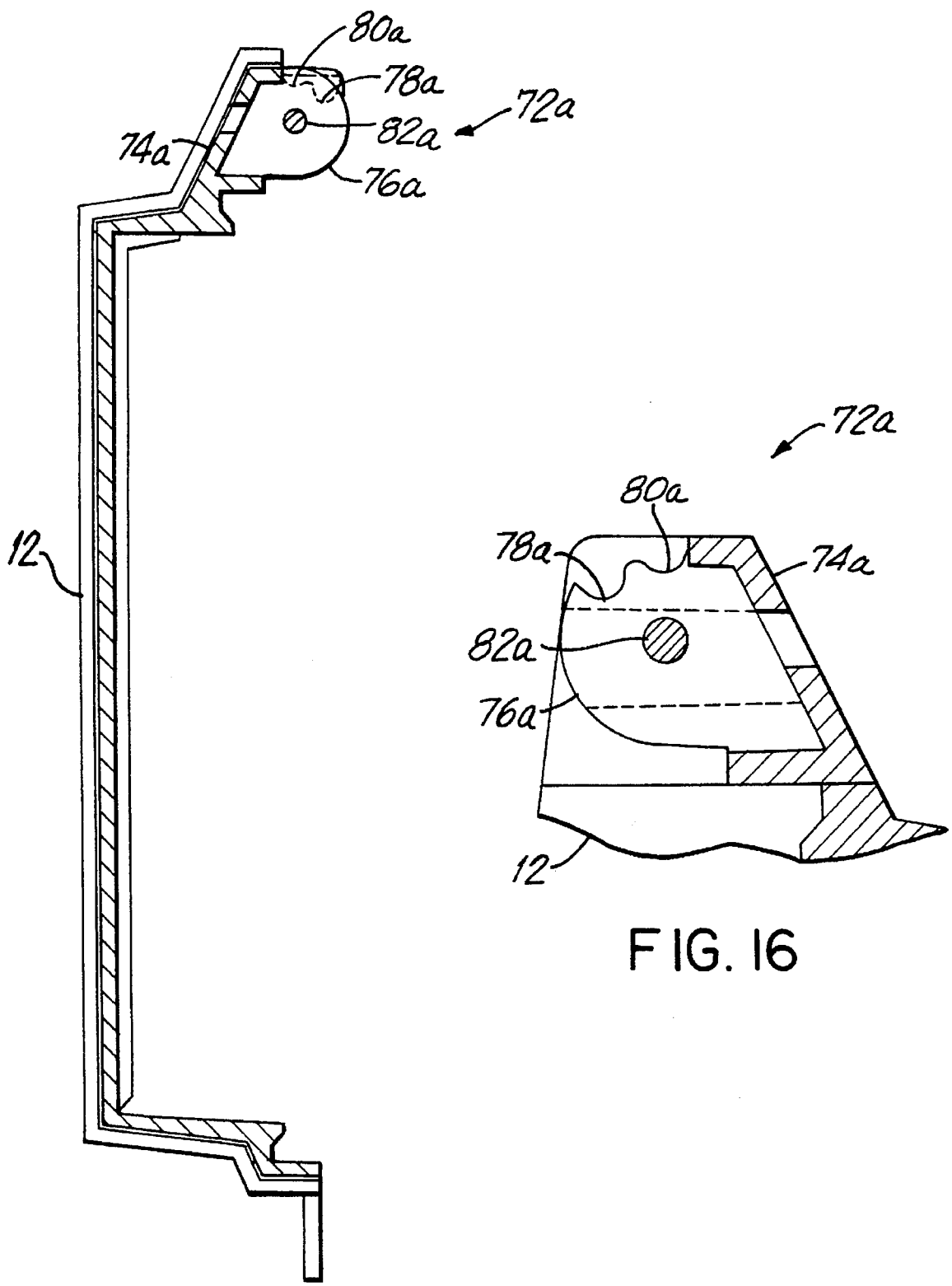
FIG. 15 is a sectional view of the subscriber cover of the network interface enclosure at sectional lines 15—15 in FIG. 12.
FIG. 16 is a sectional view of elements of the detent mechanism attached to the subscriber cover of the network interface enclosure at sectional lines 16—16 in FIG. 12.
Figure 17:
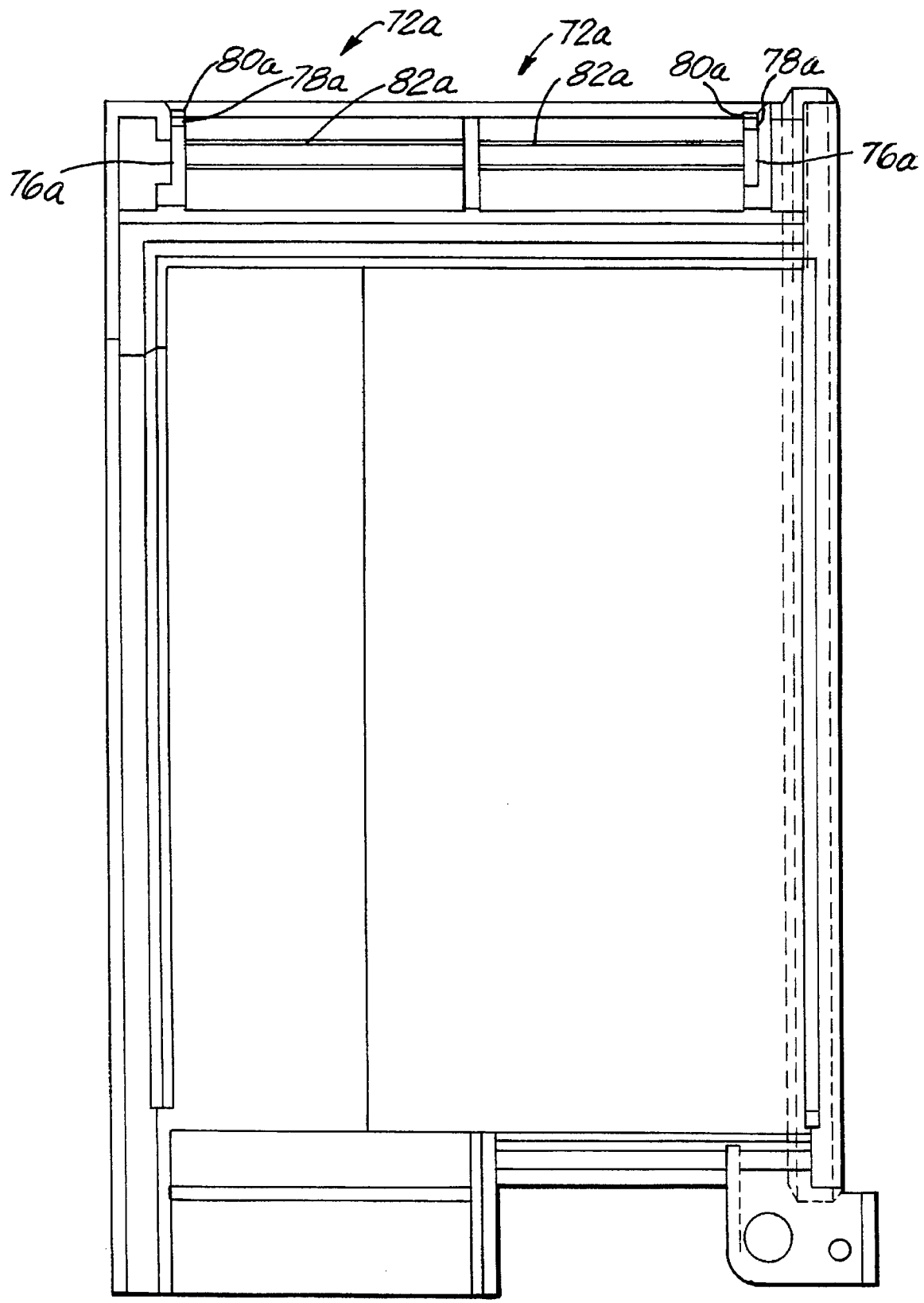
FIG. 17 is a rear view of the subscriber cover of the network interface enclosure.
Figure 18:
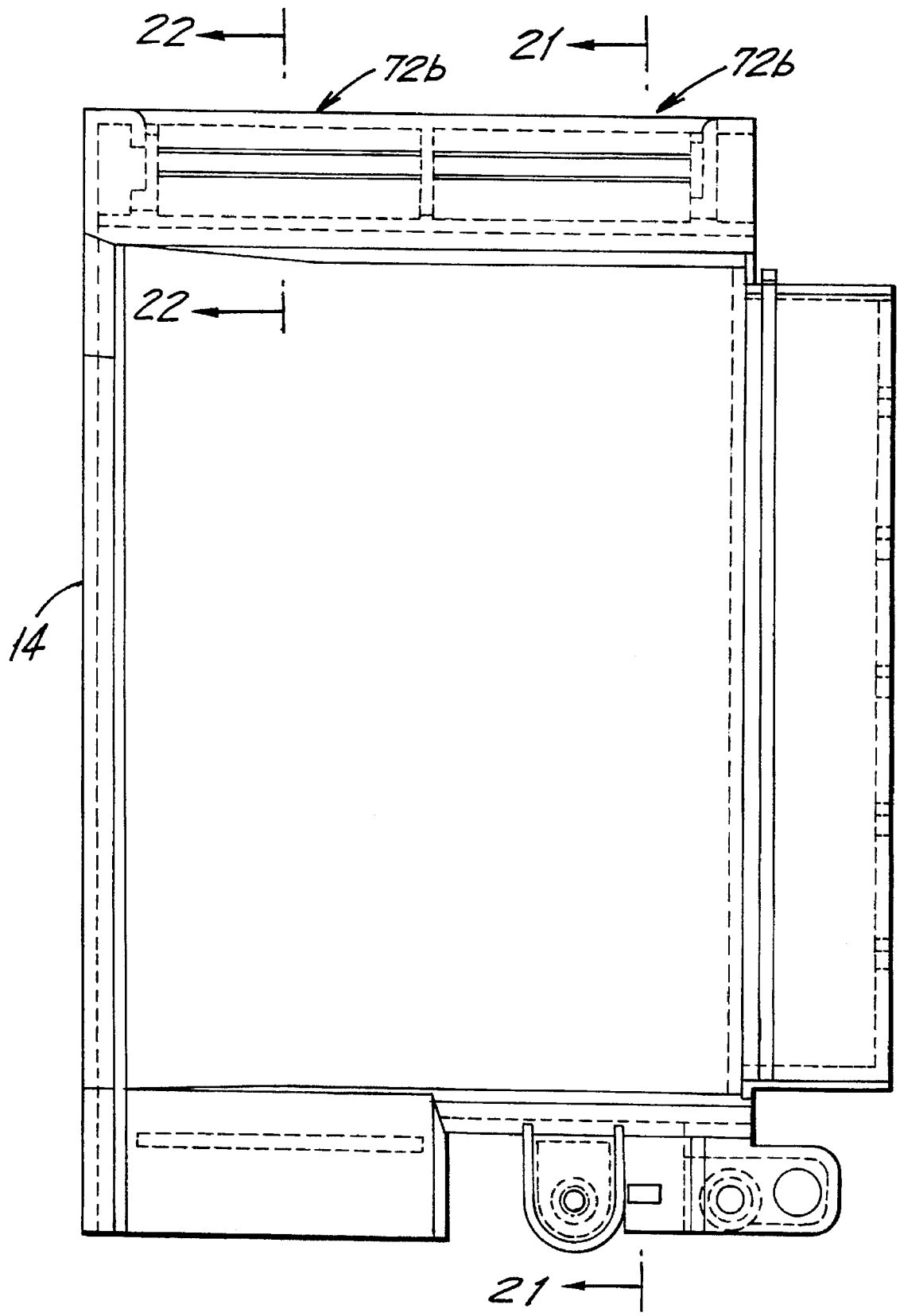
FIG. 18 is a front view of the telco cover of the network interface enclosure.
Figure 19:
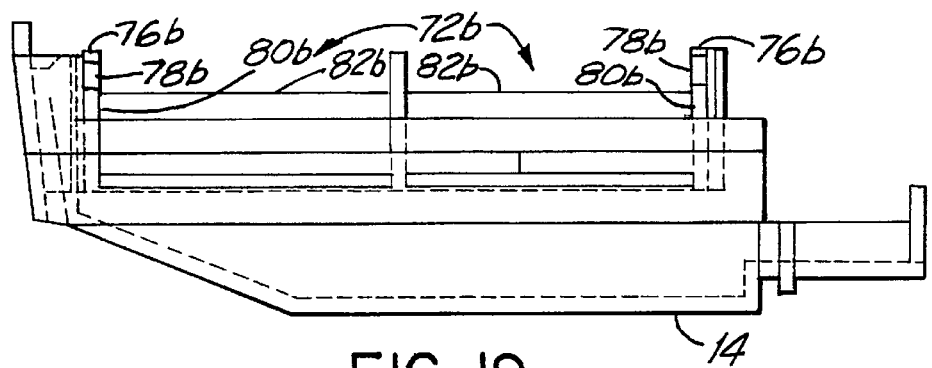
FIG. 19 is a top view of the telco cover of the network interface enclosure.
Figure 20:
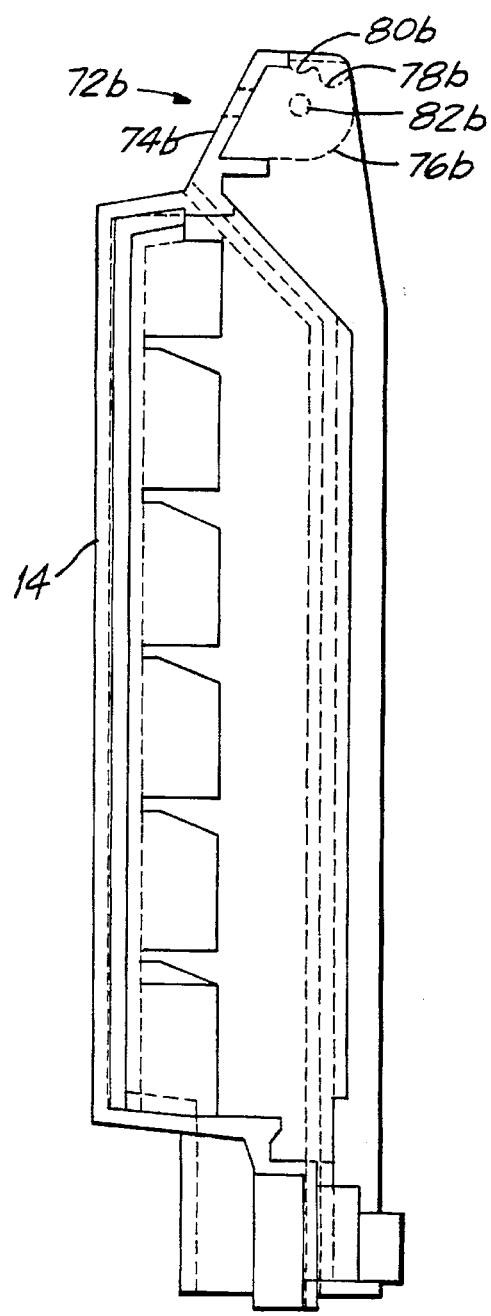
FIG. 20 is a side view of the telco cover of the network interface enclosure.
Figure 23:
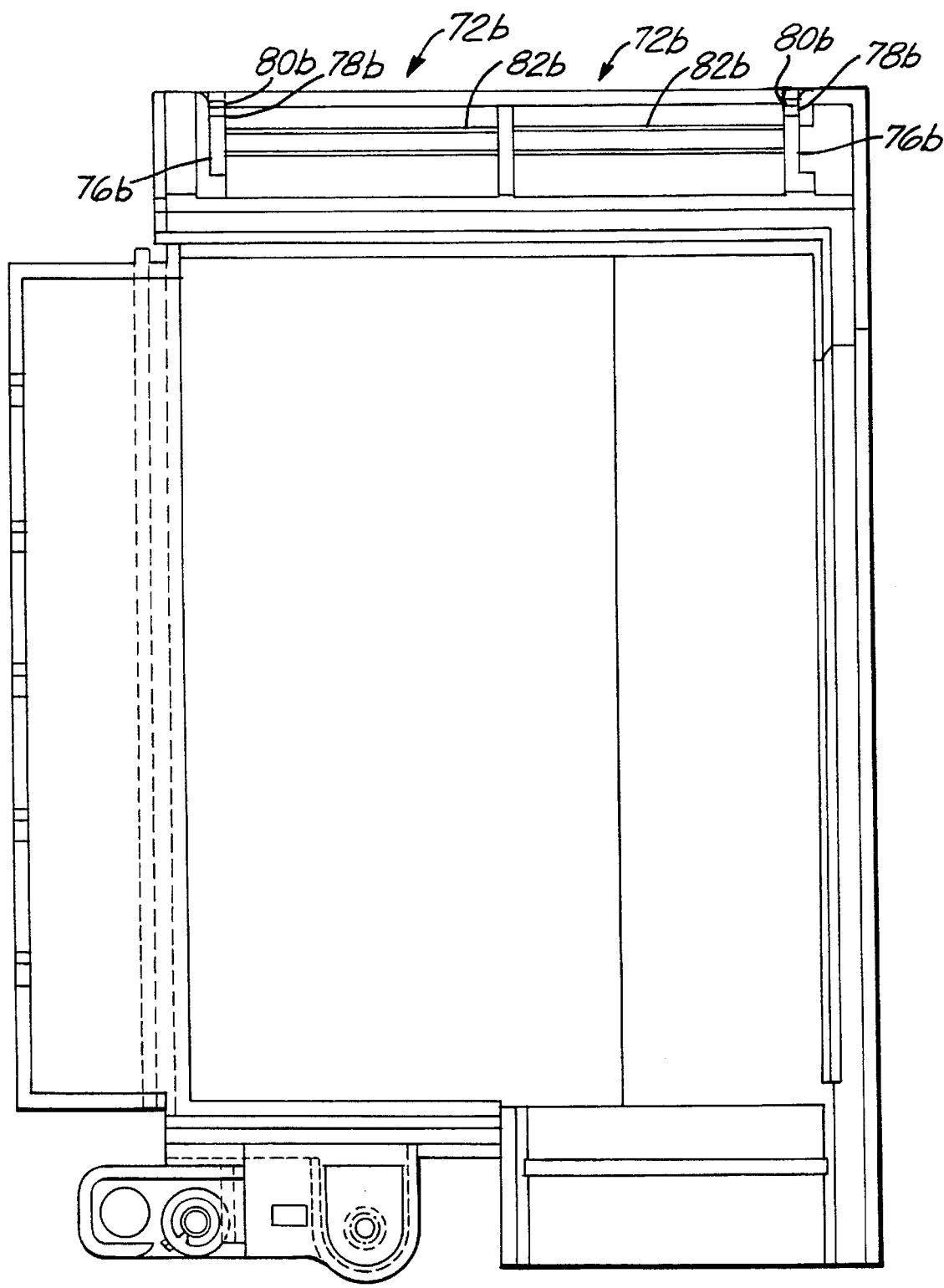
FIG. 23 is a rear view of the telco cover of the network interface enclosure.

The telco cover 14 is secured in a closed position by fastener 26. When the fastener 26 is removed, the telco cover can be lifted upward and generally hinged about the detent mechanisms 20b to an open position as shown in FIG. 4.

Removal of fastener 26 requires a special tool that is not available to a subscriber. When the subscriber and telco covers are in the open position, subscriber and telco portions of the compartment 17 for receiving network interface devices 18 and the subscriber and telco portions of the network interface devices 18 are visible.

The telephone network interface enclosure 10 includes removably mounted network interface devices 18. Network interface devices 18 may be used to connect telco and subscriber wiring in the form conventional telco and subscriber wiring and coaxial or fiber optic cable.

The telephone network interface enclosure 10 has openings 28 for receiving subscriber and telco wiring. The openings 28 may be provided with grommets 30 and covered with downward extending protective cover members 32 for covering the subscriber and telco wiring. As would be understood by a person skilled in the art, the telephone network interface enclosure 10 may be provided with other means for weather proofing, for example sealed electrical connections and/or gels.

The telephone network interface apparatus shown in FIGS. 3 and 4 is designed to contain up to six modular network interface devices. As would be understood by a person of ordinary skill in the art, the telephone network interface enclosure may be designed to contain more or less than six network interface devices 18 as shown.

As shown in FIG. 3, when the subscriber cover 12 is open, subscribers can assess the subscriber portion of the network interface devices 18. However, subscribers may choose to protect their telephone lines from persons seeking illicit access. The subscriber portion of the network interface devices 18 can be covered by individual subscriber security covers 34 which are secured by padlocks 36. The security covers 34 limit access to the subscriber portion of the network interface devices 18. When the padlocks are removed, the individual security covers 34 hinge open at hinges 38 and the subscriber portion of the network interface devices 18 are fully exposed to the subscribers.

The individual subscriber security covers 34 do not prevent the telephone company from accessing the subscriber portions of the network interface devices. When the telco cover is open, the padlocks 36 can be removed so that the individual security cover 34 can be hinged open.

Referring to FIGS. 5–11, the base portion 16 of the network interface enclosure 10 is shown in greater detail. The base portion 16 includes the compartment 17 for mounting network interface devices 18. The base portion 16 also includes mounting brackets 52, 54 and 56 for mounting the network interface enclosure 10 on a vertical surface.

The base portion 16 includes, at its upper end, elements 58 forming portions of the detent mechanisms 20. In particular, the base portion 16 includes fingers 62, 64 and 66 that project from base portion 16 of the network interface enclosure 10 and that cooperate to form a slot 68 and a stop 70 that projects from base portion 16 of the network interface enclosure 10.

Referring to FIGS. 12–17, the subscriber cover 12 of the network interface enclosure 10 is shown in greater detail. The subscriber cover 12 includes, at its upper end, elements 72a forming portions of the detent mechanisms 20a. In particular, the subscriber cover 12 includes a projection 74a having a caming surface 76a, notches 78a and 80a and a pin 82a.

Referring to FIGS. 18–23, the telco cover 14 of the network interface enclosure 10 is shown in greater detail. The telco cover 14 includes, at its upper end, elements 72b forming portions of the detent mechanism 20b. The elements of the telco cover 14 that form portions of the detent mechanism 20b are identical to the elements of the subscriber cover 12 forming elements of the detent mechanism 20a. That is, the telco cover 14 includes a projection 74b having a caming surface 76b, notches 78b and 80b and a pin 82b.

Referring to FIGS. 24-29, the operation of the detent mechanism 20 of the network interface enclosure is shown. In FIGS. 24 and 25, the subscriber cover 12 is in a closed position. When the subscriber cover is in a closed position as shown in FIGS. 24 and 25, the caming surface 76a of the subscriber cover 12 rests upon the stop 70 of the base portion 16 of the network interface enclosure 10. The pin 82a of the subscriber cover 12 is retained in the slot 68 formed between fingers 62, 64 and 66 of the base portion 16 of the network interface enclosure 10. The resting of the caming surface 76a on the stop 70 causes the pin 82a to be retained between fingers 62, 64, and 66 at upper portion of the slot 68.

Figure 26:
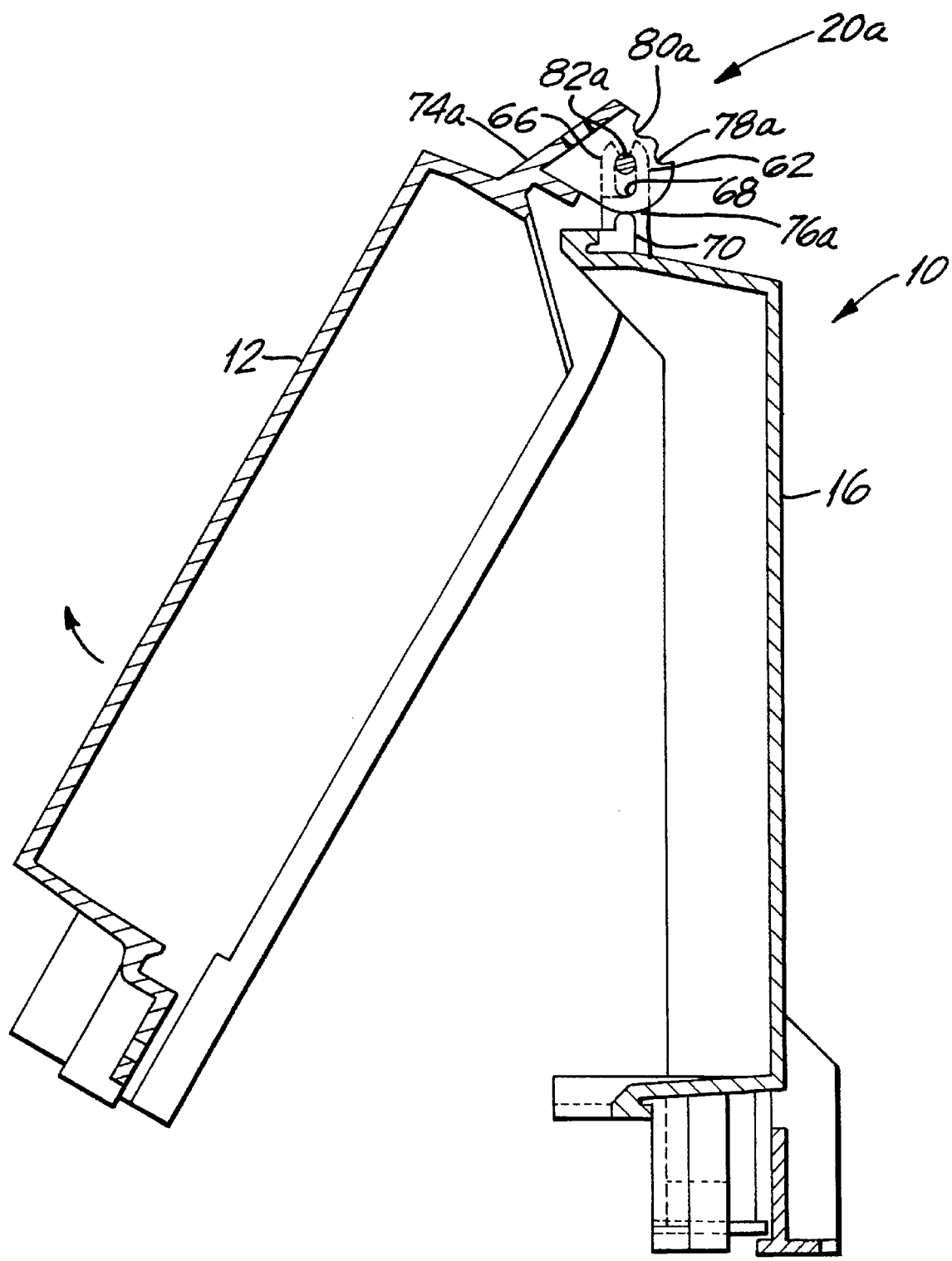
FIG. 26 is a sectional view of the network interface enclosure showing operation of the detent mechanism as the subscriber cover is opened.
Figure 27:
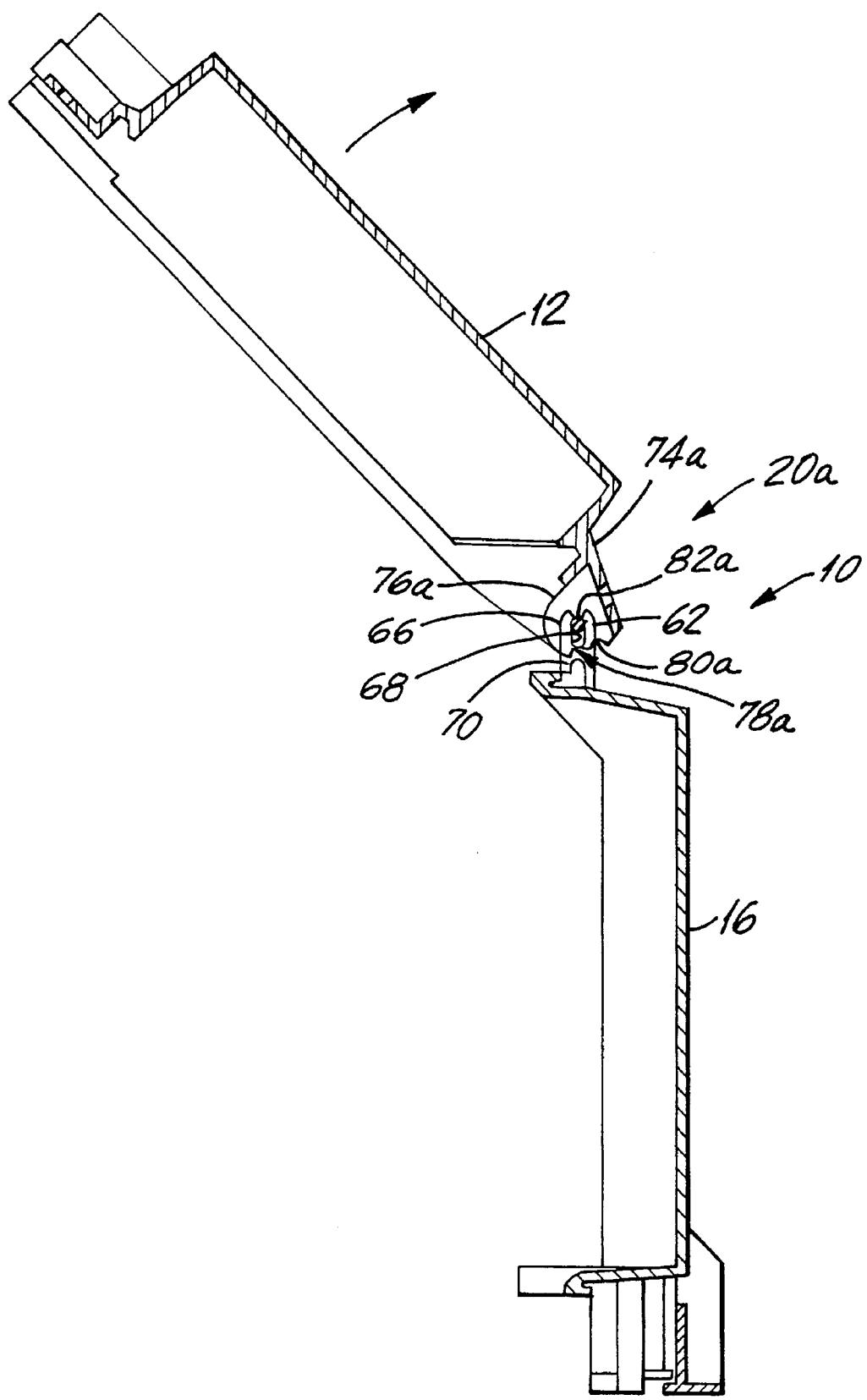
FIG. 27 is a sectional view of the network interface enclosure showing operation of the detent mechanism as the subscriber cover is brought to a first open position.
Figure 28:
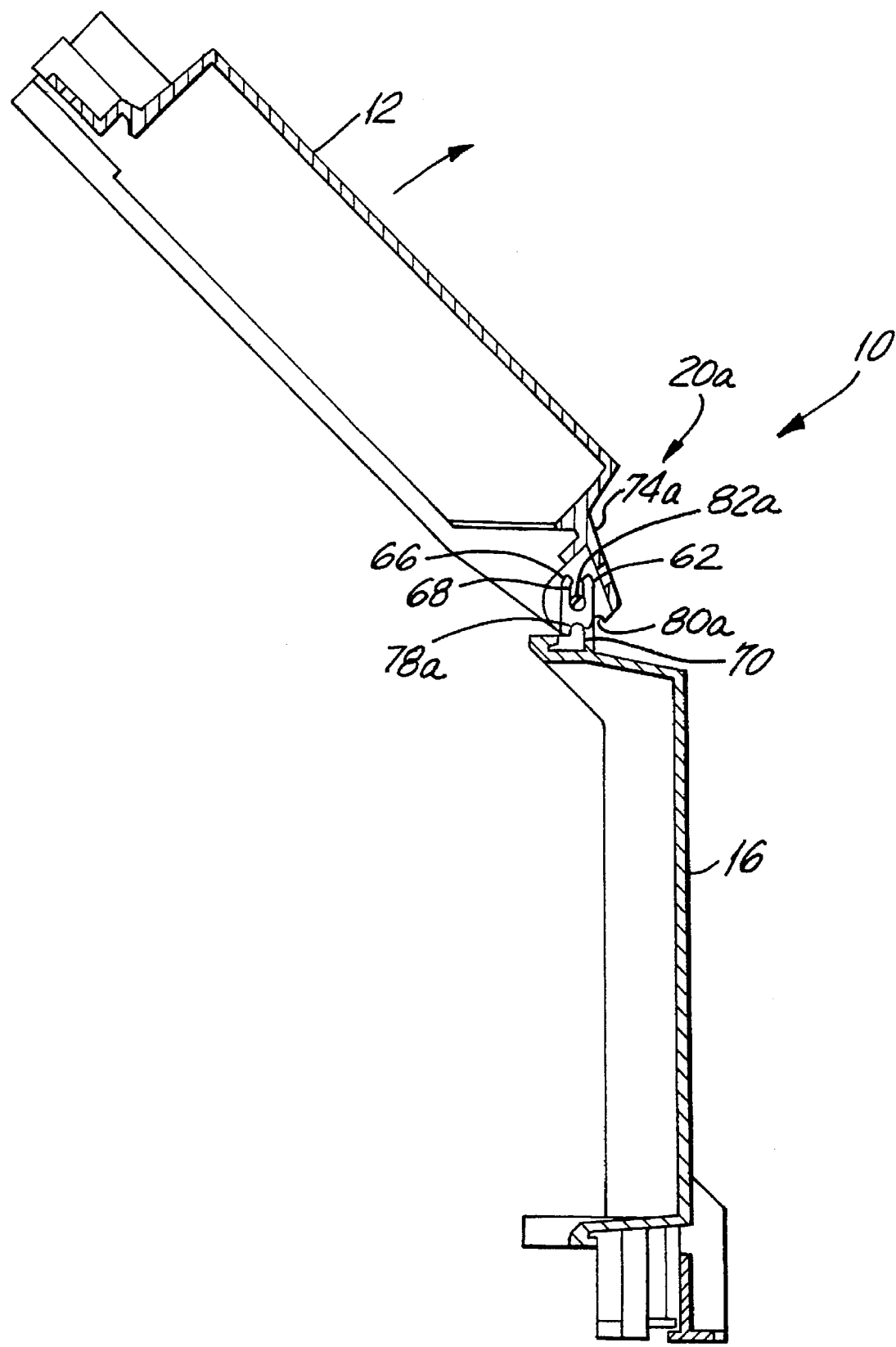
FIG. 28 is a sectional view of the network interface enclosure showing operation of the detent mechanism as the subscriber cover is retained in a first open position.

As the cover 12 is opened, as shown in FIG. 26, the caming surface 76a of the subscriber cover 12 rides along the top surface of the stop 70 of the base portion 16 of the network interface enclosure 10. As the caming surface 76a rides along the stop 70, the pin 82a of the subscriber cover 12 remains retained at the upper portion of the slot 68 formed between fingers 62, 64 and 66 in the base portion 16 of the network interface enclosure 10.

As the subscriber cover 12 is lifted upwardly, the caming surface 76a of subscriber cover 12 continues to ride along the stop 70 of the base portion 16 of the network interface enclosure 10 until the stop reaches notch 78a on the caming surface of the subscriber cover 12. When the stop 70 reaches notch 78a, the cover 12 shifts downward slightly so that stop 70 is retained in notch 78a. As the cover 12 shifts downwardly, pin 82a remains in the slot 68 between fingers 62, 64 and 66 in the base portion 16 of the network interface enclosure 10. However, the downward shift of the cover 12, results in the pin 82a being retained in the lower portion of the slot 68. The subscriber cover 12 is thereby secured in a first open position by the detent mechanism 20a including fingers 62, 64 and 66 stop 70 and notch 78a.

Figure 29:
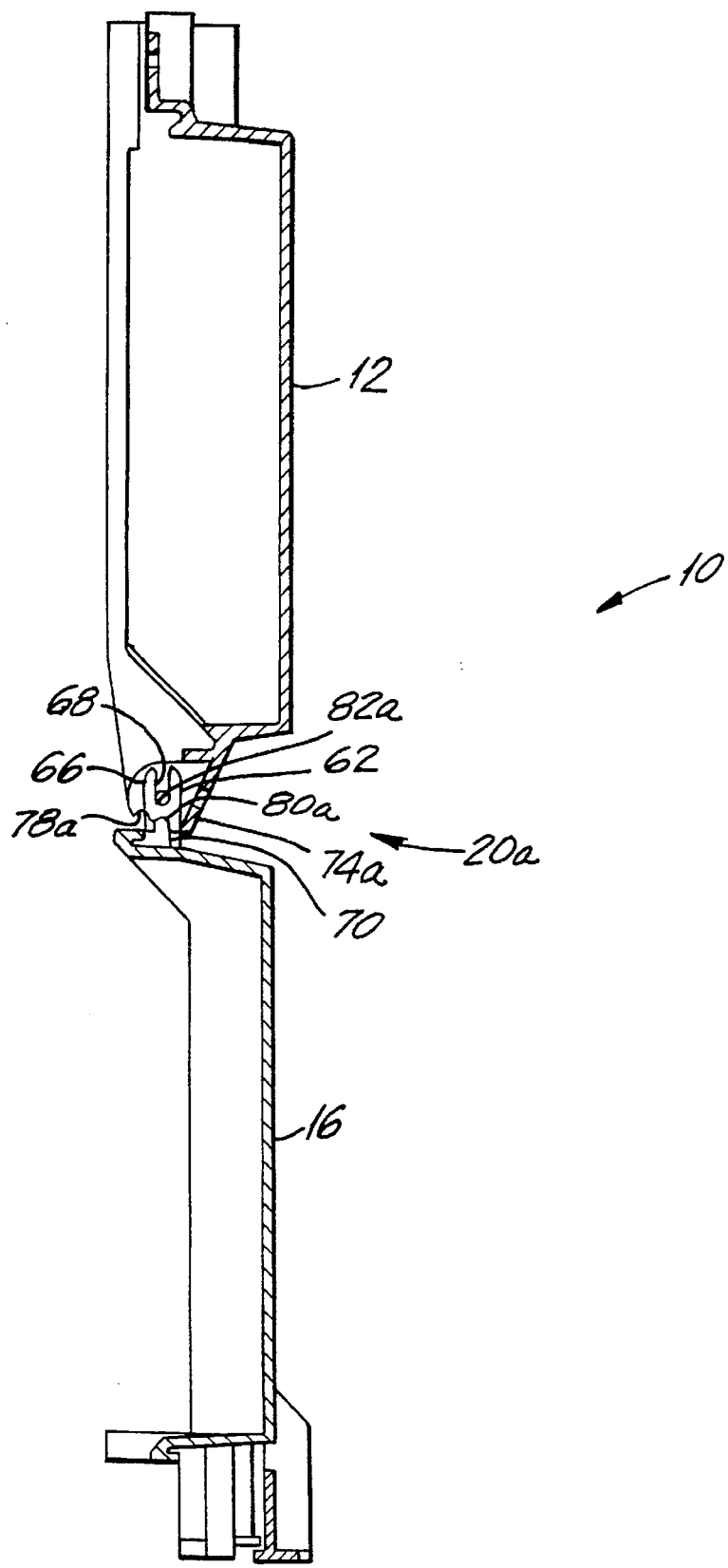
FIG. 29 is a sectional view of the network interface enclosure showing operation of the detent mechanism as the subscriber cover is retained in a second open position.

The subscriber cover 12 may be lifted further to a second open position as shown in FIG. 29. As the subscriber cover is lifted upwardly, stop 70 lifts out of notch 78a over a bump 79a separating notches 78a and 80a and into notch 80a. As the stop 70 rides over the bump 79a (FIG. 24), the subscriber cover momentarily moves upwardly so that the pin moves upwardly to the upper portion of the slot 68. When the stop 70 rides over bump 79a into notch 80a the subscriber cover 12 shifts downwardly again such that stop 70 is retained in notch 80a and the subscriber cover is retained in slot 68 between fingers 62, 64 and 66 at the lower portion of slot 68. It would be understood by persons skilled in the art that any number of notches may be carved out of caming surface 76 to allow securing the cover in multiple positions.

It would be further understood by persons skilled in the art that while the operation of the detent mechanism is explained with reference to the subscriber cover 12, the operation of the detent mechanism with regard to the telco cover 14 is identical.

Figure 30:
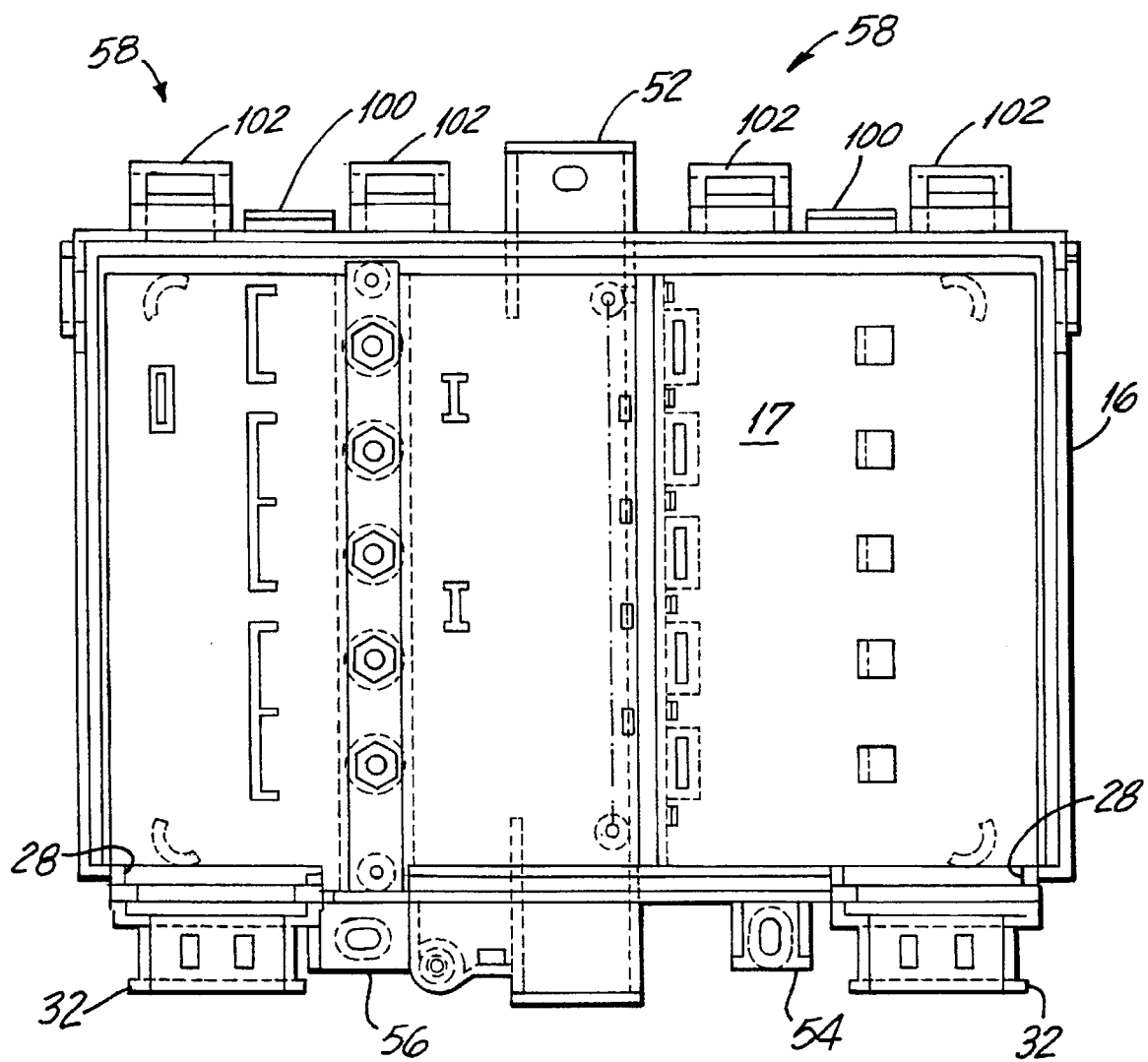
FIG. 30 is a front view of a base portion of an alternative embodiment of the network interface enclosure.
Figure 31:
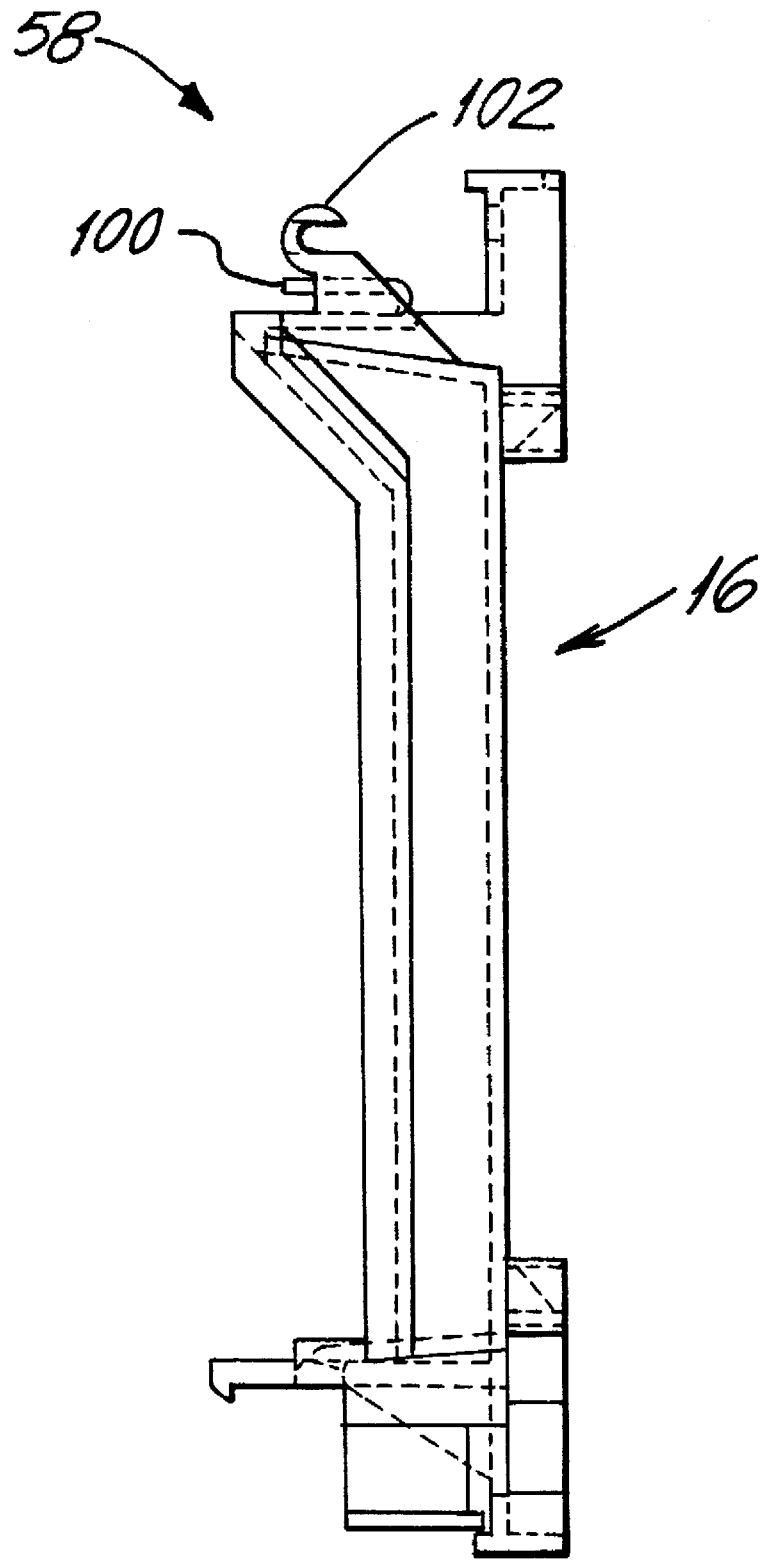
FIG. 31 is a side view of the base portion of the alternative embodiment of the network interface enclosure.

Referring to FIGS. 30 through 40, there is shown an alternative embodiment of the telephone network interface enclosure according to the principles of the present invention. Referring, in particular, to FIGS. 30 and 31, there is shown the base portion 16 of the alternative embodiment of the telephone network interface enclosure. The base portion 16 includes, at its upper end, element 58 forming portions of the detent mechanism 20. In particular, the base portion 16 includes a cantilever spring 100 and a hinge portion 102 which project from the upper end of the base portion 16.

Figure 32:
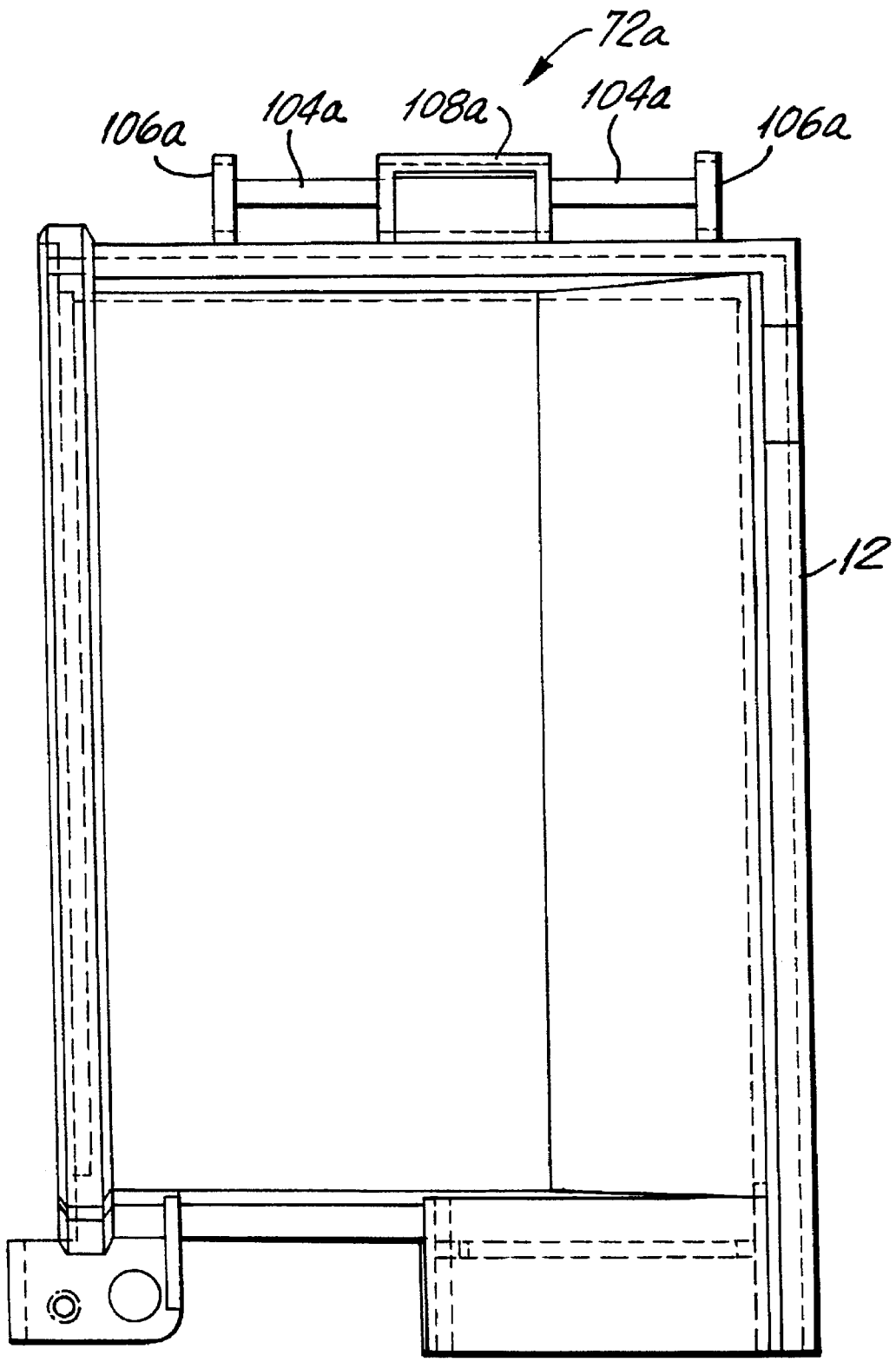
FIG. 32 is a front view of a subscriber cover of the alternative embodiment of the network interface enclosure.
Figure 33:
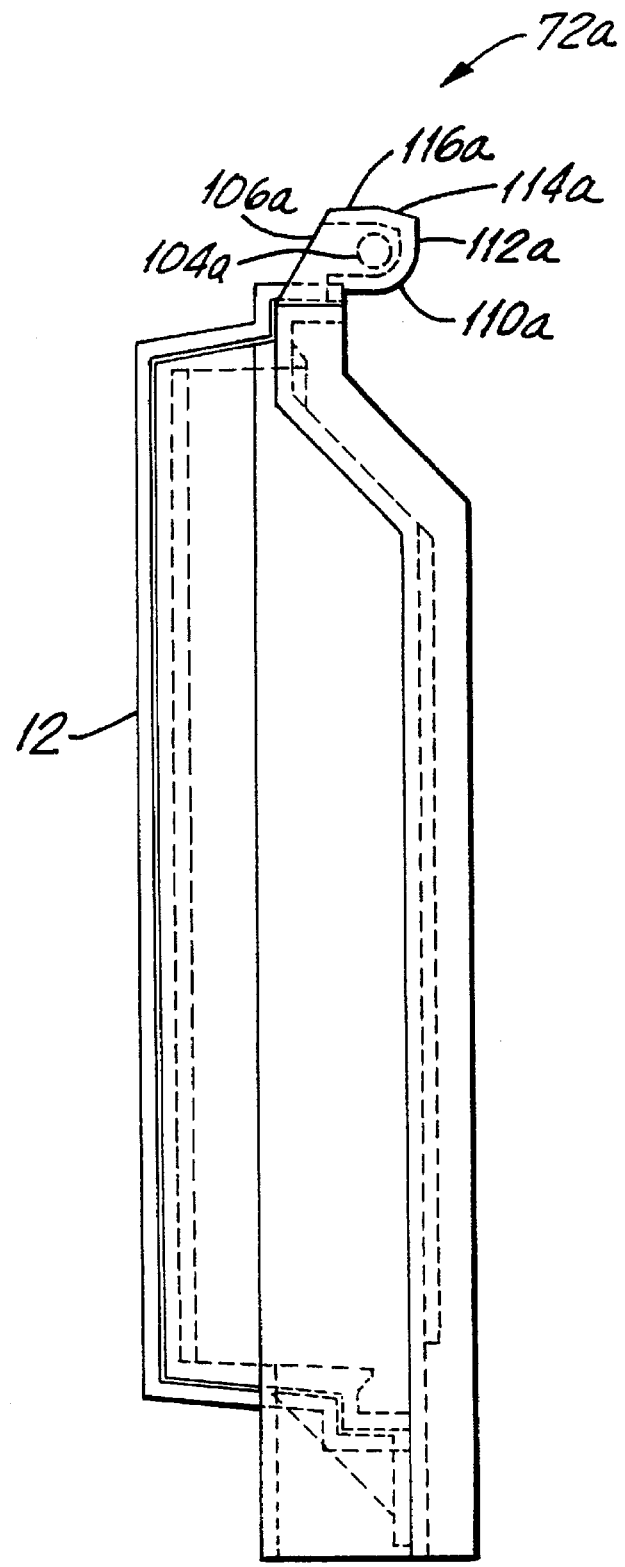
FIG. 33 is a side view of the subscriber cover of the alternative embodiment of the network interface enclosure.

Referring to FIGS. 32 and 33, the subscriber cover 12 of the network interface enclosure is shown in greater detail. The subscriber cover 12 includes, at its upper end, elements 72a forming portions of the detent mechanism 20a. In particular, the subscriber cover 12 includes projections 106a having caming surfaces 110a and flat surfaces 112a, 114a, and 116a, a projection 108a, and pins 104a supported by the projections 106a and 108a.

Figure 34:
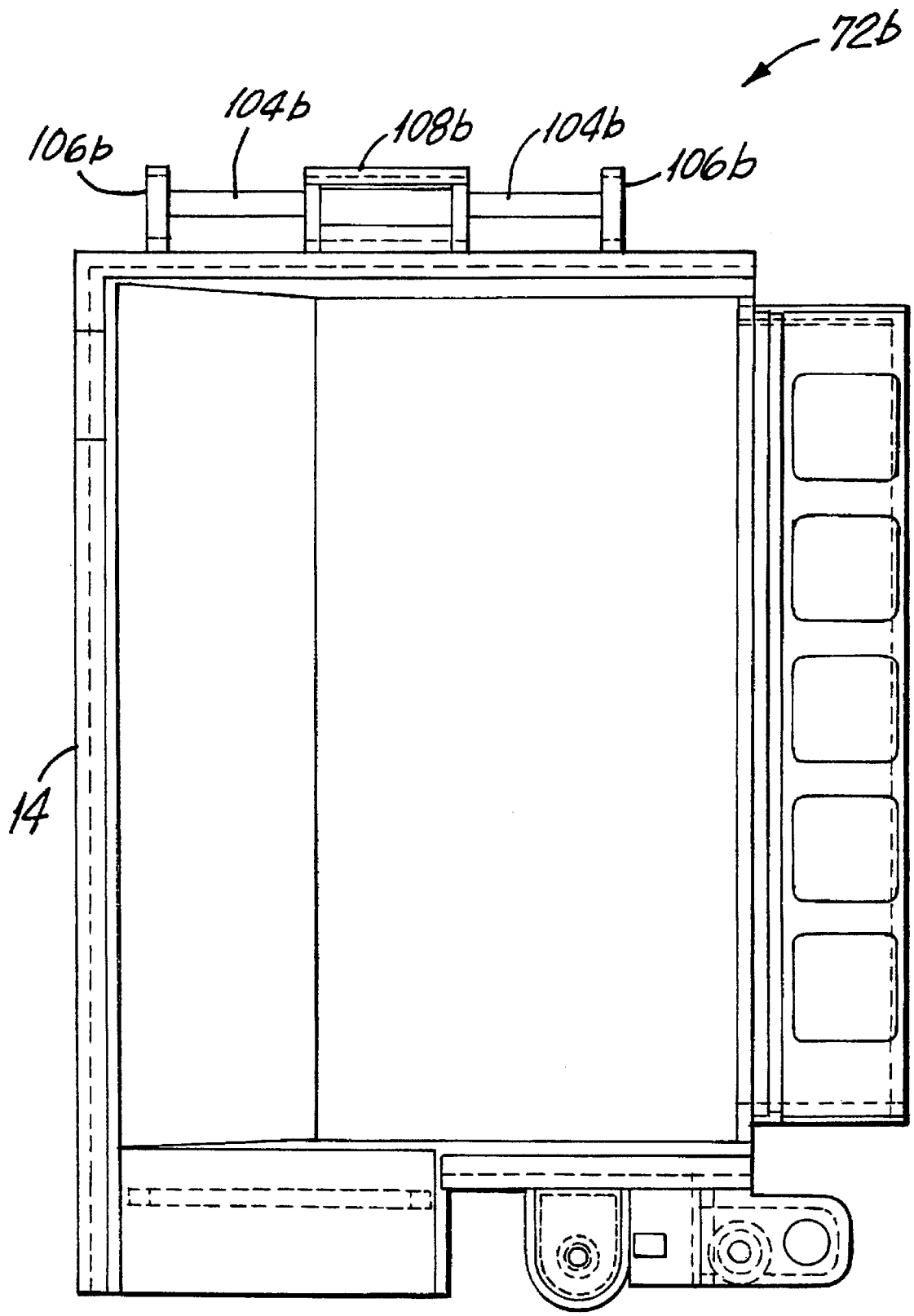
FIG. 34 is a front view of a telco cover of the alternative embodiment of the network interface enclosure.
Figure 35:
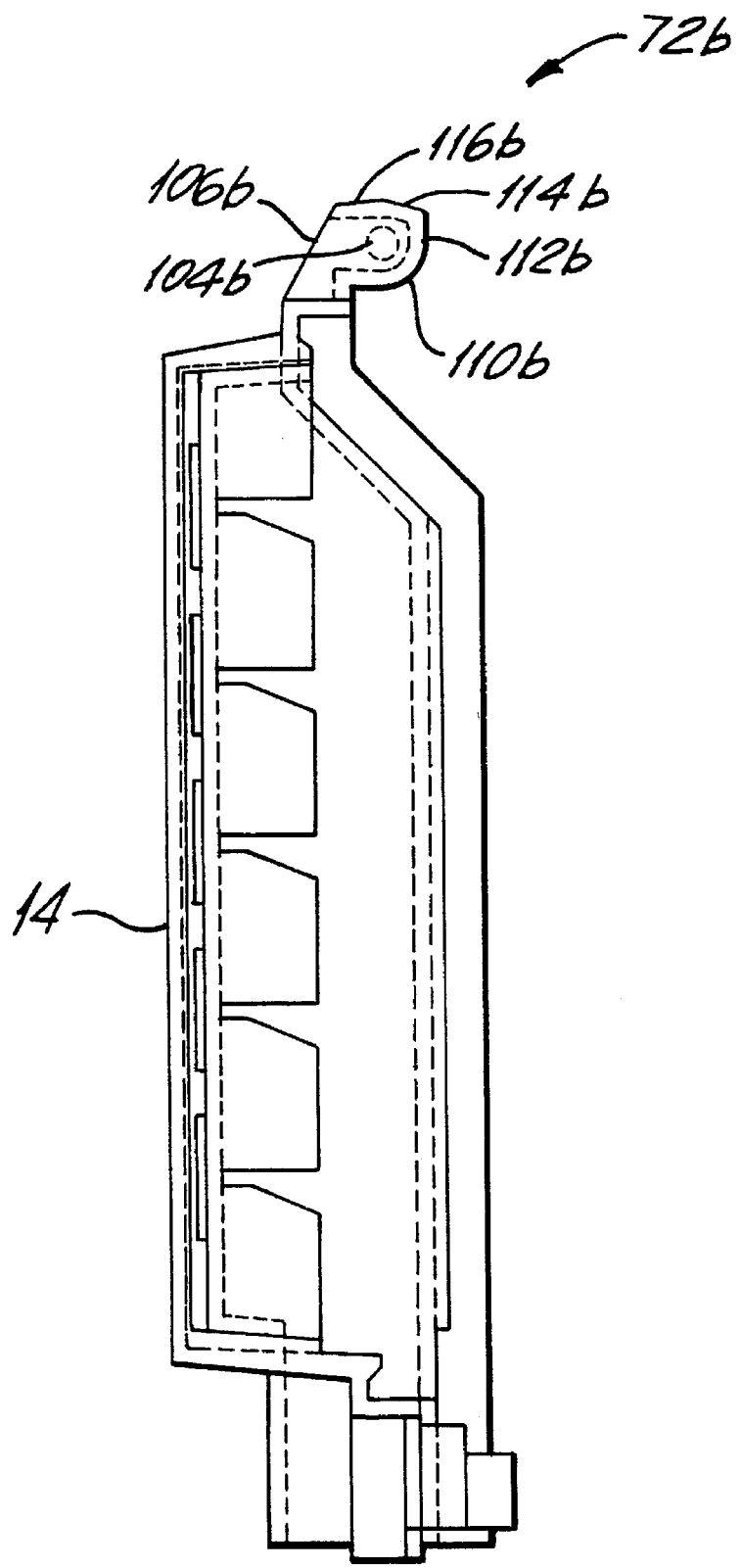
FIG. 35 is a side view of the telco cover of the alternative embodiment of the network interface enclosure.

Referring to FIGS. 34 and 35, the telco cover of the alternative embodiment of the network interface enclosure is shown. The telco cover 14 includes, at its upper end, elements 72b forming portions of the detent mechanism 20b. The elements of the telco cover 14 that form portions of the detent mechanism 20b are identical to the elements of the subscriber cover 12 forming elements of the detent mechanism 20a. That is, the telco cover 14 includes projections 106b having caming surfaces 110b and flat surfaces 112b, 114b, and 116b, a projection 108b, and pins 104b supported between projections 106b and 108b.

Referring to FIGS. 36 through 40, the operation of the detent mechanism 20 of the alternative embodiment of the network interface enclosure is shown. The pin 104b which is supported by projections 106b and 108b of the telco cover 14 is retained in hinge portion 102 of the base portion 16. When the pin 104b is retained in the hinge portion 102, the caming surface 110b of the projection 106b of the telco cover 14 rests upon the cantilever spring 100 of the base portion 16.

Figure 36:
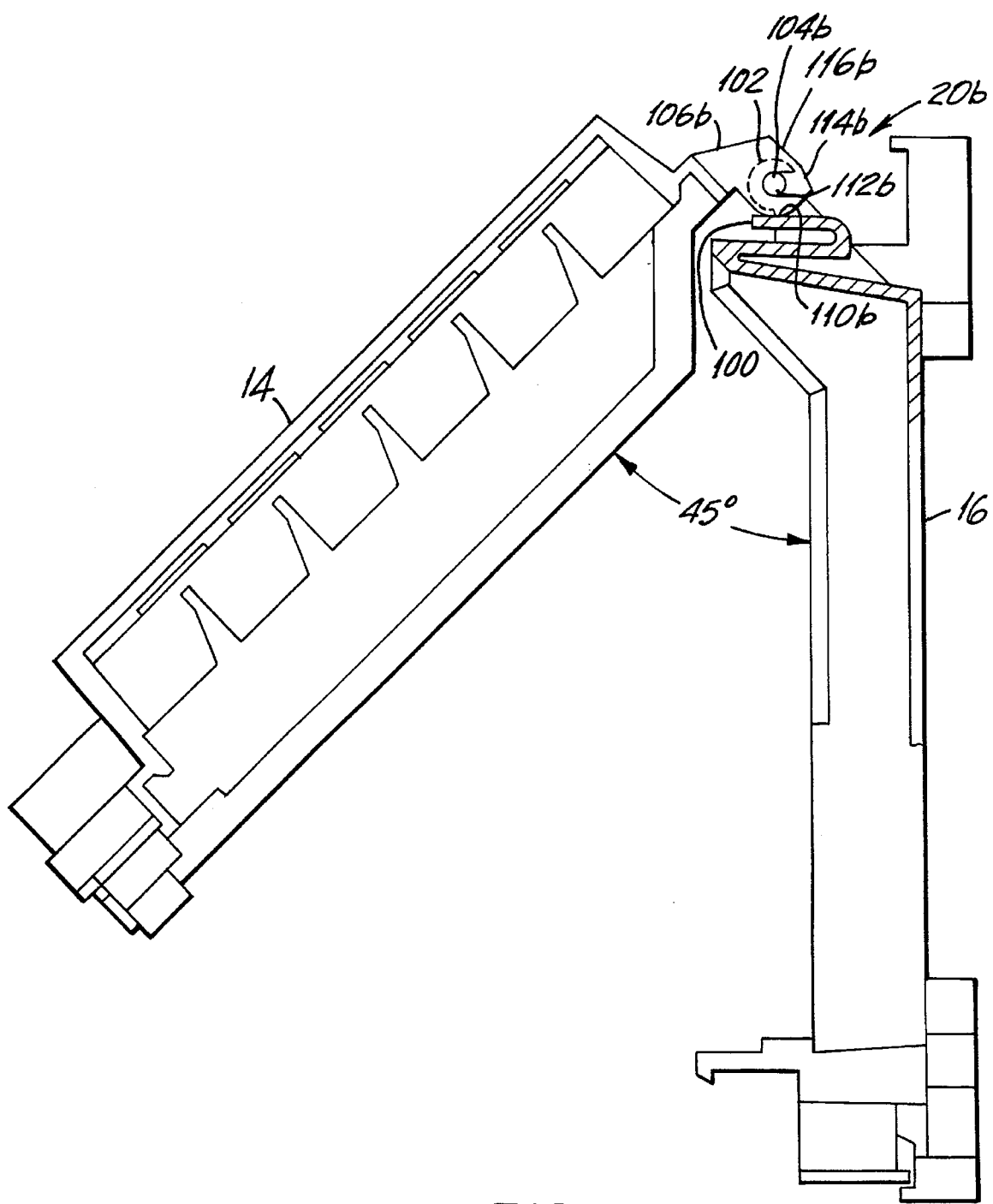
FIG. 36 is a sectional view of the alternative embodiment of the network interface enclosure showing operation of the detent mechanism as the telco cover is opened.
Figure 37:
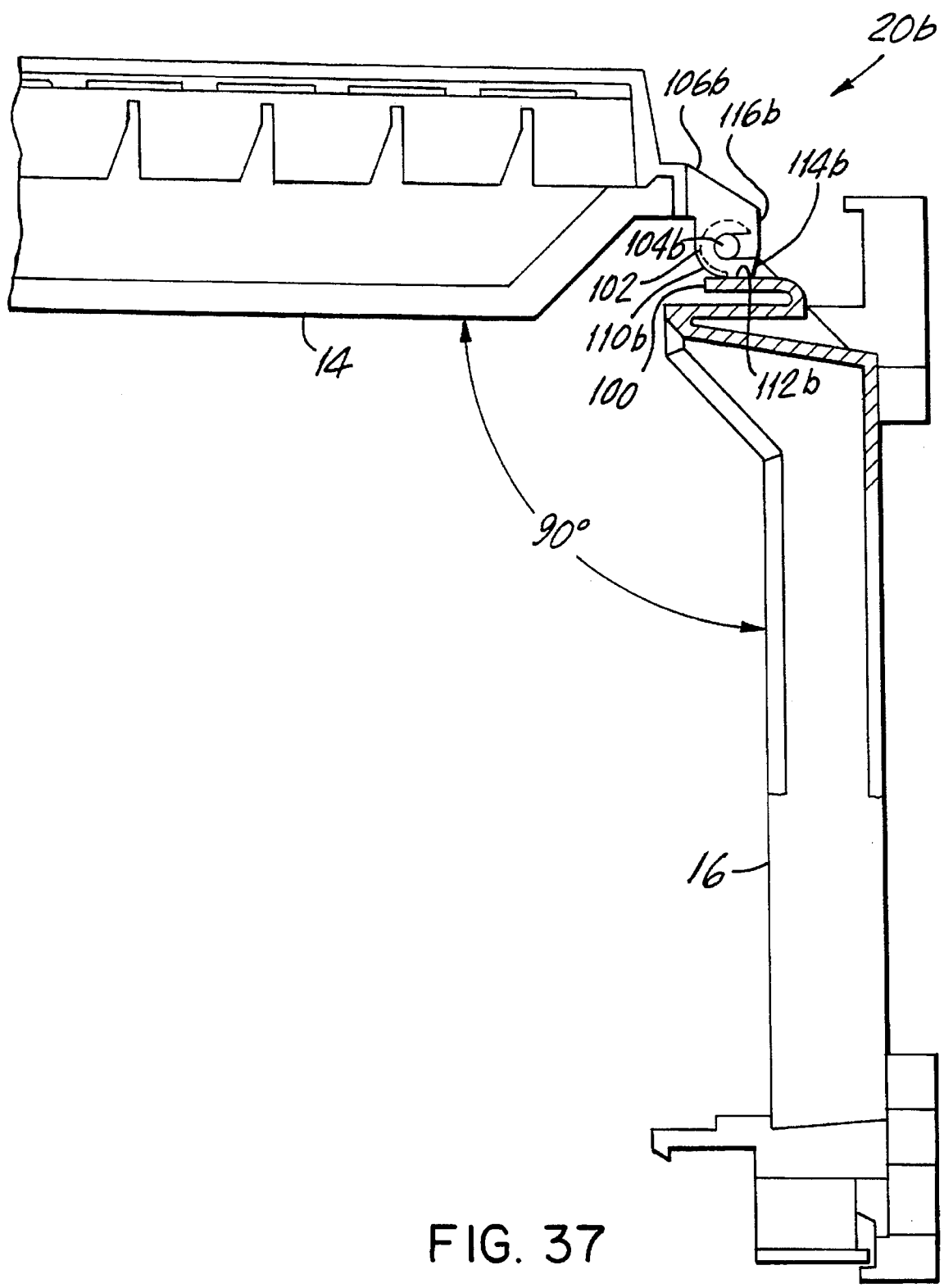
FIG. 37 is a sectional view of the alternative embodiment of the network interface enclosure showing operation of the detent mechanism before the telco cover is retained in a first open position.

As the telco cover 14 is opened as shown in FIG. 36, the caming surface 110b of the telco cover 14 rides along the top surface of the cantilever spring 100 of the base portion 16. As the telco cover 14 is lifted upwardly still further, the caming surface 110b of the telco cover 14 continues to ride along the top surface of the cantilever spring 100 of the base portion 16 until the flat surface 112b of the projection 106b reaches the cantilever spring 100.

Figure 38:
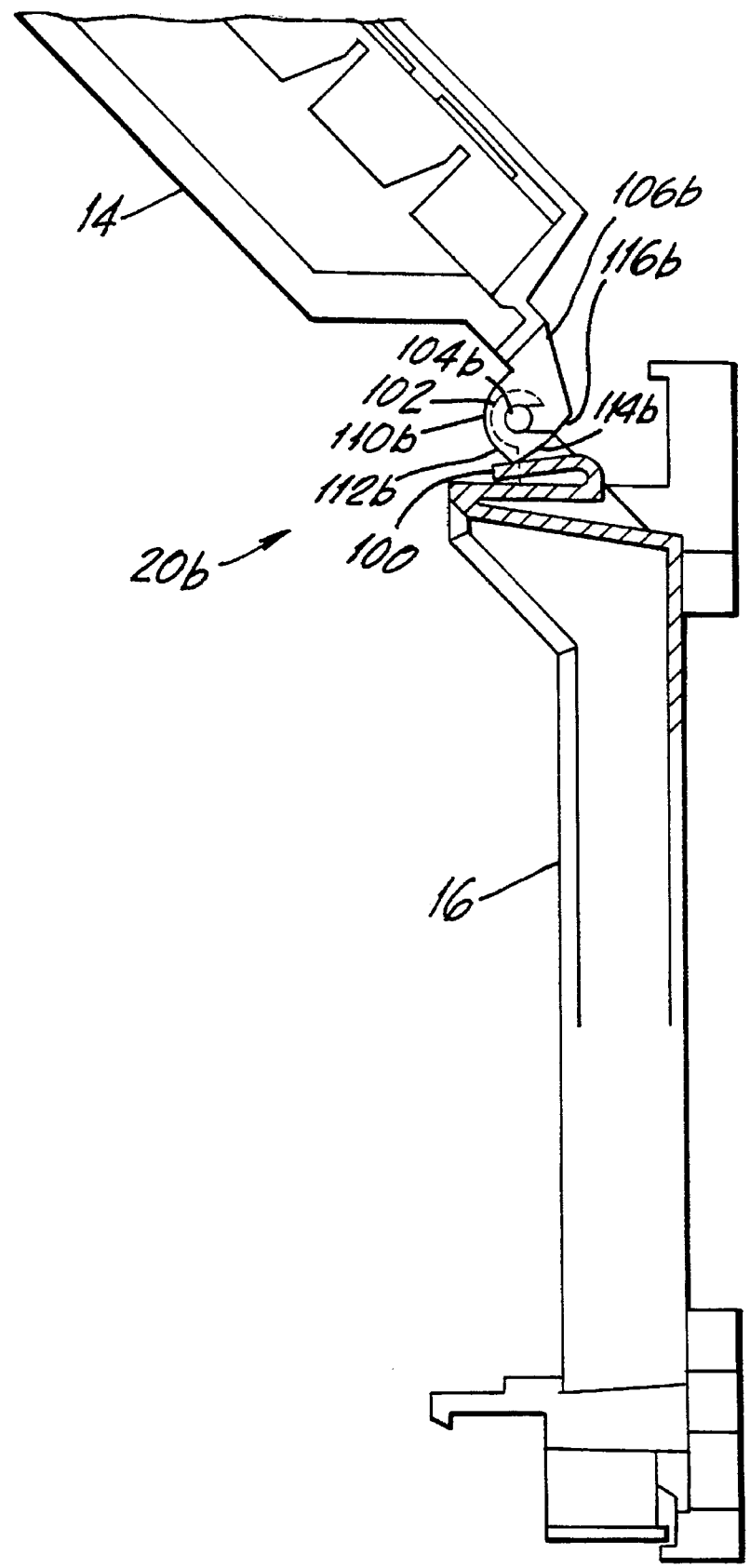
FIG. 38 is a sectional view of the alternative embodiment of the network interface enclosure showing operation of the detent mechanism as the telco cover is brought to a first open position, deflecting the cantilever spring prior to being retained in the first open position.
Figure 39:
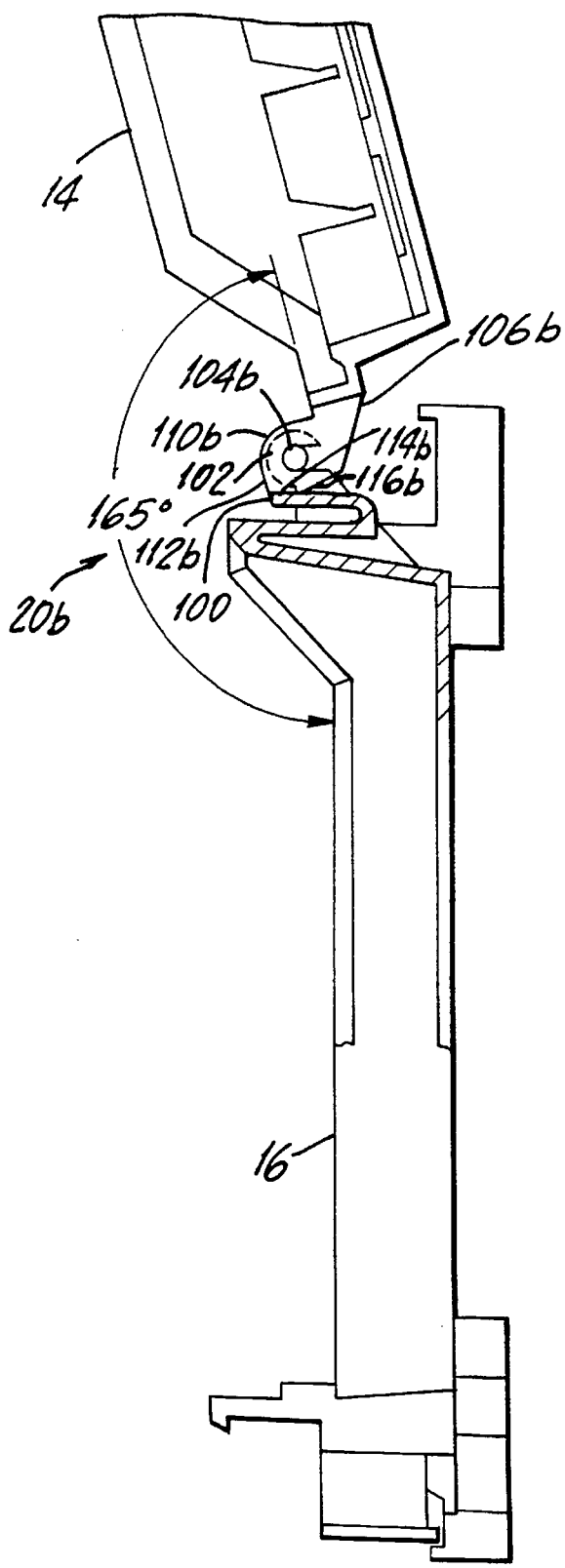
FIG. 39 is a sectional view of the alternative embodiment of the network interface enclosure showing operation of the detent mechanism as the telco cover is retained in a first open position.

The telco cover 14 may be lifted upwardly still further. As shown in FIG. 38, when the telco cover 14 is lifted upwardly, a corner formed between flat surfaces 112b and 114b on the projection 106b of the telco cover 14 contacts the cantilever spring 100 and forces the cantilever spring 100 to deflect. As the corner passes over the cantilever spring 100, the cantilever spring 100 rebounds such that the flat surface 114b of the projection 106b rests upon the cantilever spring 100. When the flat surface 114b rests upon the cantilever spring 100, the force of the cantilever spring against the flat surface 114b causes the telco cover 14 to be retained in a first open position.

Figure 40:
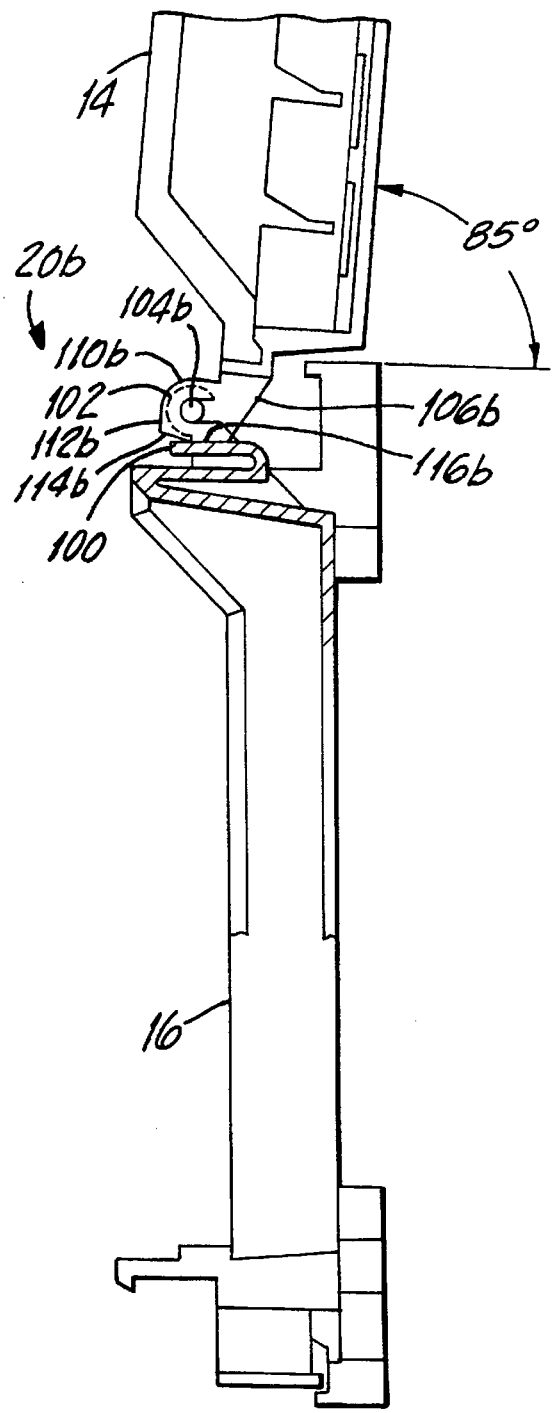
FIG. 40 is a sectional view of the alternative embodiment of the network interface enclosure showing operation of the detent mechanism as the telco cover is retained in a second open position.

The telco cover 14 may be lifted upwardly still further. As shown in FIG. 40, when the telco cover 14 is lifted upwardly the flat surface 116b rests upon the top surface of the cantilever spring 100 such that the force of the cantilever spring against the flat surface 116b causes the telco cover 14 to be retained in a second open position.

It would be understood by persons skilled in the art that while the operation of the detent mechanism of the alternative embodiment of the network interface enclosure is explained with reference to the telco cover 14 the operation of the detent mechanism with regard to the subscriber cover 12 is identical.

While the present invention has been described by reference to various preferred embodiments, it will be understood by persons skilled in the art that many modifications and variations may be made in those preferred embodiments without departing from the spirit and scope of the present invention. Accordingly, it is intended that the invention not be limited to the disclosed preferred embodiments of that it have the full scope permitted by the following claims.

I claim:

1. A network interface enclosure adapted for mounting on a vertical surface, comprising:

(a) a base adapted to be secured to the vertical surface, the base having an upper portion;

(b) a cover adapted to be secured to the upper portion of the base, the cover being adapted to rotate upwardly about the upper portion of the base when the base is secured to the vertical surface;

(c) a detent mechanism formed of cooperating elements on the base and the cover for maintaining the cover in an open position after the cover has been rotated upwardly at least about 90° from a closed position;

(d) the detent mechanism includes (1) a slot formed between fingers that project from the upper portion of the base, the slot having upper and lower portions, (2) a pin on the cover adapted to be received in the slot on the upper portion of the base, (3) a stop located on the upper portion of the base, (4) a caming surface on the cover adapted to ride upon the stop on the upper portion of the base and (5) a notch on the caming surface of the cover adapted to receive the stop on the upper portion of the base;

(e) the slot, pin, stop and notch of the detent mechanism cooperating to allow the cover to move between the closed position and a first opened position and to hold the cover in the first opened position;

(f) whereby, when the cover is in the closed position, the caming surface on the cover rests on the stop on the upper portion of the base and the pin on the cover is retained in the upper portion of the slot formed between the fingers projecting from the upper portion of the base, as the cover is rotated upwardly, the caming surface on the cover rides along the stop on the upper portion of the base with the pin retained in the upper portion of the slot between the fingers projecting from the upper portion of the base, when the stop on the upper portion of the base reaches the notch of the caming surface on the cover, the cover shifts downwardly so that the stop on the upper portion of the base is retained in the notch of the caming surface on the cover and the pin on the cover is retained in the lower portion of the slot formed between the fingers projecting from the upper portion of the base thereby securing the cover in the first opened position.

2. The network interface enclosure of claim 1 where the cover is maintained in the open position after the cover has been rotated upwardly at least about 135° from the closed position.

3. The network interface enclosure of claim 1 where the cover is maintained in the open position after the cover has been rotated upwardly at least about 180° from the closed position.

4. The network interface enclosure of claim 1 where the cover is maintained in the open position after the cover has been rotated upwardly at least about 165° from the closed position.

5. The network interface enclosure of claim 1 wherein the detent mechanism includes a second notch on the caming surface of the cover adapted to receive the stop on the upper portion of the base, a bump between the first and second notches on the caming surface of the cover; the slot, pin, second notch and stop of the detent mechanism cooperate to hold the cover in a second opened position; whereby, as the cover is rotated upwardly beyond the first opened position, the stop on the upper portion of the base lifts out of the first notch on the caming surface of the cover and rides over the bump between the first and second notches in the caming surface of the cover momentarily lifting the pin on the cover upwardly in the slot formed between the fingers projecting from the upper portion of the base, and when the stop on the upper portion of the base reaches the second notch on the caming surface of the cover, the cover shifts downwardly so that the stop on the upper portion of the base is retained in the second notch on the caming surface of the cover and the pin on the cover is retained in the lower portion of the slot formed between the fingers projecting from the upper portion of the base thereby securing the cover in the second opened position.

6. A network interface enclosure adapted for mounting on a vertical surface, comprising:

(a) a base adapted to be secured to the vertical surface, the base having an upper portion;

(b) a cover adapted to be secured to the upper portion of the base, the cover being adapted to rotate upwardly about the upper portion of the base when the base is secured to the vertical surface;

(c) a detent mechanism formed of cooperating elements on the base and the cover for maintaining the cover in an open position after the cover has been rotated upwardly at least about 90° from a closed position;

(d) the detent mechanism includes (1) a cantilever spring located on the upper portion of the base, (2) a caming surface on the cover adapted to ride upon the cantilever spring on the upper portion of the base, and (3) a flat surface on the caming surface of the cover adapted to rest on the cantilever spring on the upper portion of the base;

(e) the flat surface and the cantilever spring of the detent mechanism cooperate to allow the cover to move between the closed position and a first opened position and to hold the cover in the first opened position;

(f) whereby, when the cover is in the closed position, the caming surface on the cover rests on the cantilever spring on the upper portion of the base, as the cover is rotated upwardly, the caming surface rides along the cantilever spring on the upper portion of the base, when the flat surface on the caming surface of the cover reaches the cantilever spring on the upper portion of the base, the interaction of the flat surface on the caming surface of the cover and the cantilever spring on the upper portion of the base secures the cover in the first opened position.

7. The network interface enclosure of claim 6 wherein the detent mechanism includes a second flat surface on the caming surface of the cover and a corner formed between the first and second flat surfaces on the caming surface of the cover; the second flat surface and the cantilever spring of the detent mechanism cooperate to hold the cover in a second opened position; whereby, as the cover is rotated upwardly beyond the first opened position, the cantilever spring on the upper portion of the base is momentarily deflected by the corner formed between the first and second flat surfaces on the caming surface, and when the second flat surface on the caming surface of the cover reaches the cantilever spring on the upper portion of the base, the interaction of the second flat surface on the caming surface of the cover and the cantilever spring on the upper portion of the base secures the cover in the second opened position.

* * * * *